United States Patent
Agrawal et al.

(10) Patent No.: US 10,165,025 B2
(45) Date of Patent: Dec. 25, 2018

(54) TECHNIQUES FOR HTTP LIVE STREAMING OVER EMBMS

(71) Applicant: QUALCOMM Incorporated, San Diego, CA (US)

(72) Inventors: Mona Agrawal, San Diego, CA (US); Nagaraju Naik, San Diego, CA (US); Carlos Marcelo Dias Pazos, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 15/079,180

(22) Filed: Mar. 24, 2016

(65) Prior Publication Data
US 2016/0294900 A1  Oct. 6, 2016

Related U.S. Application Data

(60) Provisional application No. 62/142,975, filed on Apr. 3, 2015.

(51) Int. Cl.
*G06F 15/16* (2006.01)
*H04L 29/06* (2006.01)
*H04L 29/08* (2006.01)

(52) U.S. Cl.
CPC ...... *H04L 65/4076* (2013.01); *H04L 65/4084* (2013.01); *H04L 65/608* (2013.01); *H04L 65/80* (2013.01); *H04L 67/02* (2013.01)

(58) Field of Classification Search
CPC .................................................. H04L 65/608
USPC ........................................................ 709/231
See application file for complete search history.

(56) References Cited

U.S. PATENT DOCUMENTS

| 7,734,821 B2 | 6/2010 | Wang et al. |
| 8,977,704 B2 | 3/2015 | Liu et al. |
| 2011/0231519 A1 | 9/2011 | Luby et al. |
| 2011/0320287 A1* | 12/2011 | Holt ............... G06Q 30/00 705/14.73 |
| 2013/0044670 A1* | 2/2013 | Jang ............... H04W 4/06 370/312 |
| 2013/0254634 A1 | 9/2013 | Luby et al. |
| 2014/0201334 A1* | 7/2014 | Wang ............ H04L 65/4084 709/219 |
| 2014/0307734 A1 | 10/2014 | Luby et al. |
| 2014/0344575 A1* | 11/2014 | Saremi ........... H04L 63/0428 713/168 |
| 2014/0380376 A1 | 12/2014 | Schmidt et al. |

(Continued)

OTHER PUBLICATIONS

International Search Report and Written Opinion—PCT/US2016/024129—ISA/EPO—dated Jun. 22, 2016.

(Continued)

*Primary Examiner* — Hamza N Algibhah
(74) *Attorney, Agent, or Firm* — The Marbury Law Group

(57) ABSTRACT

A method, an apparatus, and a computer program product for wireless communication are provided. The apparatus may receive template information that identifies a template for generating a plurality of uniform resource identifiers (URIs) for accessing media content. The apparatus may generate, based on the template, one or more URIs of the plurality of URIs for accessing one or more portions of the media content. The apparatus may store the one or more URIs in a playlist file.

23 Claims, 18 Drawing Sheets

(56) References Cited

U.S. PATENT DOCUMENTS

| | | | | |
|---|---|---|---|---|
| 2015/0178263 A1* | 6/2015 | Meschkat | ............. | G06F 17/248 715/235 |
| 2015/0223028 A1* | 8/2015 | Wang | .................... | H04W 4/005 370/312 |
| 2015/0304122 A1* | 10/2015 | Pazos | ................. | H04L 12/1845 370/312 |
| 2016/0188743 A1* | 6/2016 | Vaish | ................ | G06F 17/30887 707/755 |

OTHER PUBLICATIONS

"3rd Generation Partnership Project; Technical Specification Group Services and System Aspects; Packet-switched Streaming Service (PSS); Improved Support for Dynamic Adaptive Streaming over HTTP in 3GPP (Release 12)," 3GPP Draft; 26938-000, 3rd Generation Partnership Project (3GPP), Mobile Competence Centre; 650, Route Des Lucioles; F-06921 Sophia-Antipolis Cedex; France, Sep. 16, 2014, XP050906954, Retrieved from the Internet: URL:http://www.3gpp.org/ftp/Specs/2014-12/Rel-12/26 series/ [retrieved on Sep. 16, 2014] p. 19, -p. 26.

\* cited by examiner

TECHNIQUES FOR HTTP LIVE STREAMING OVER EMBMS

RELATED APPLICATIONS

This application claims the benefit of U.S. Provisional Application No. 62/142,975, filed Apr. 3, 2015, the entire contents of which are hereby incorporated by reference.

BACKGROUND

Field

The present disclosure relates generally to communication systems, and more particularly, to techniques for hypertext transfer protocol (HTTP) live streaming (HLS) over evolved Multimedia Broadcast Multicast Services (eMBMS).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a user equipment, a computer program product, and an apparatus are provided.

In some aspects, the method may include receiving, by a user equipment (UE), template information that identifies a template for generating a plurality of uniform resource identifiers (URIs) for accessing media content. The method may include generating, by the UE and based on the template, one or more URIs of the plurality of URIs for accessing one or more portions of the media content. The method may include storing, by the UE, the one or more URIs in a playlist file.

In some aspects, the user equipment may include means for receiving template information that identifies a template for generating a plurality of URIs for accessing media content. The user equipment may include means for generating, based on the template, one or more URIs of the plurality of URIs for accessing one or more portions of the media content. The user equipment may include means for storing the one or more URIs in a playlist file. The user equipment may include means for providing the playlist file to a hypertext transfer protocol (HTTP) live streaming (HLS) client of the user equipment. The HLS client may use the playlist file to access the one or more portions of the media content without altering the one or more URIs.

In some aspects, the user equipment may include a memory and at least one processor coupled to the memory and configured to receive template information that identifies a template for generating a plurality of URIs for accessing media content. The at least one processor coupled to the memory may be configured to generate, based on the template, one or more URIs of the plurality of URIs for accessing one or more portions of the media content. The at least one processor coupled to the memory may be configured to store the one or more URIs in a playlist file.

In some aspects, the computer program product may include a non-transitory computer-readable medium storing computer executable code for wireless communication. The code may include code for receiving, by a user equipment, template information that identifies a template for generating a plurality of URIs for accessing media content. The code may include code for generating, by the user equipment and based on the template, one or more URIs of the plurality of URIs for accessing one or more portions of the media content. The code may include code for storing, by the user equipment, the one or more URIs in a playlist file.

BRIEF DESCRIPTION OF THE DRAWINGS

FIG. 3 is a diagram illustrating an example of a downlink (DL) frame structure in

LTE.

Figure 4:
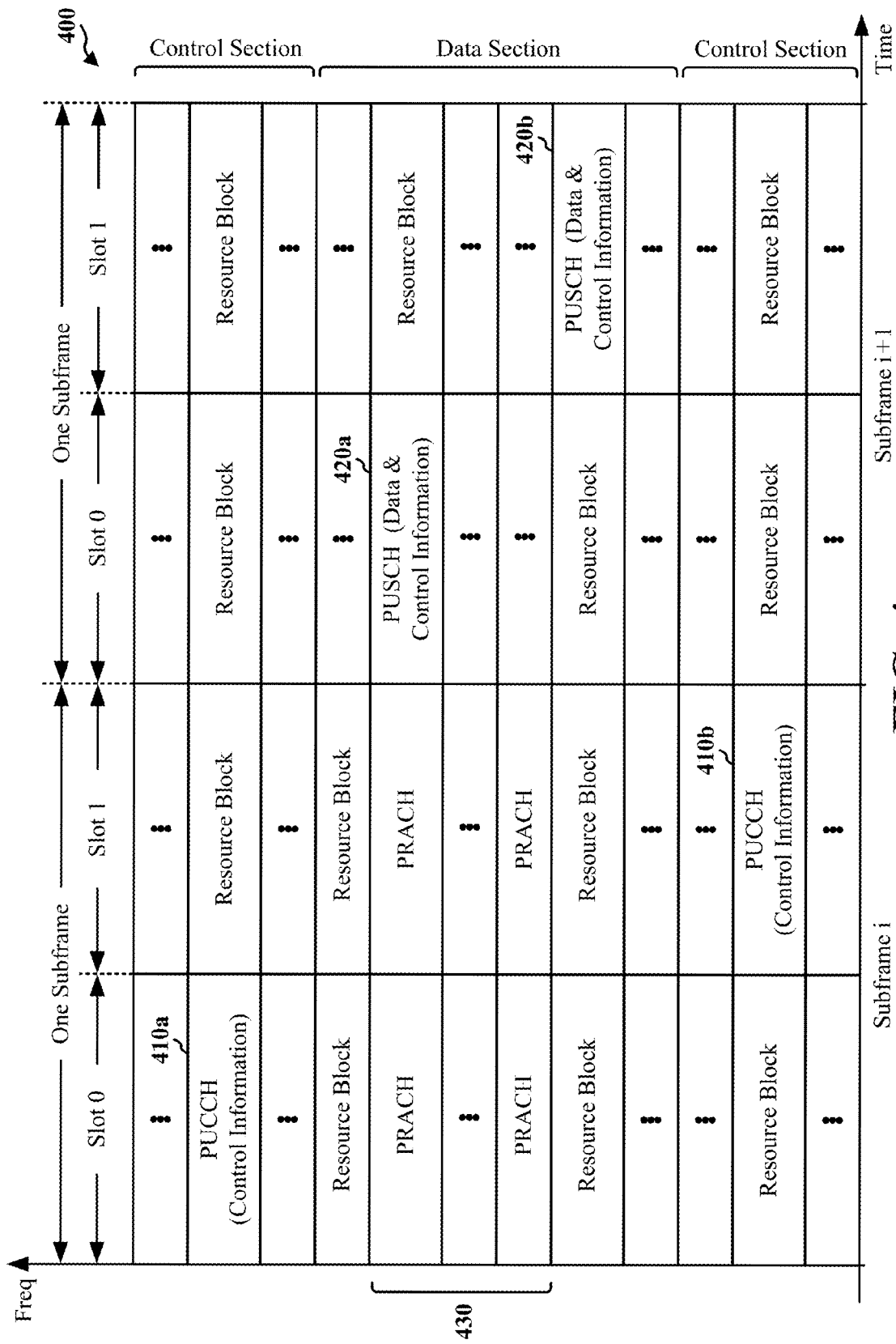

FIG. 4 is a diagram illustrating an example of an uplink (UL) frame structure in LTE.

Figure 5:
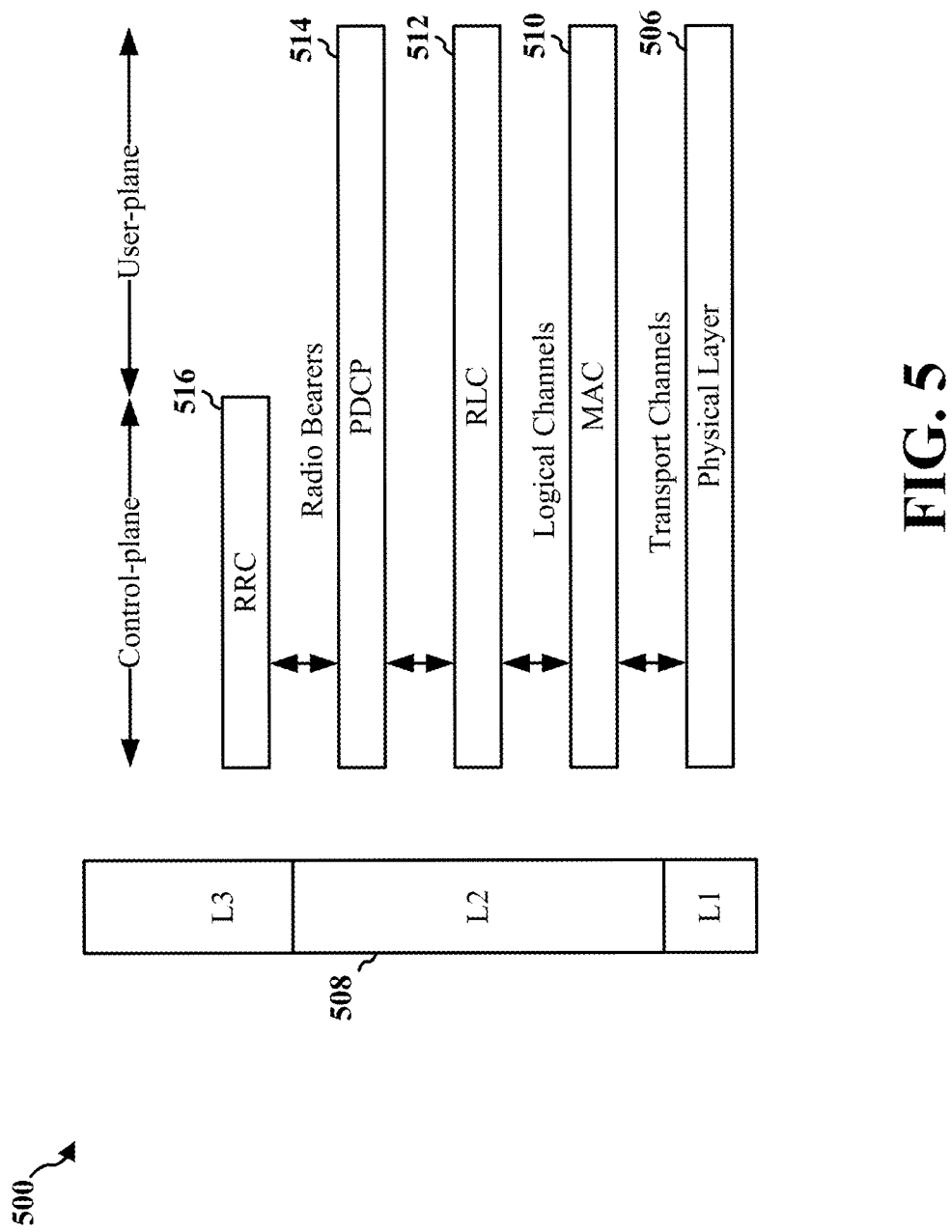

FIG. 5 is a diagram illustrating an example of a radio protocol architecture for the user and control planes.

Figure 6:
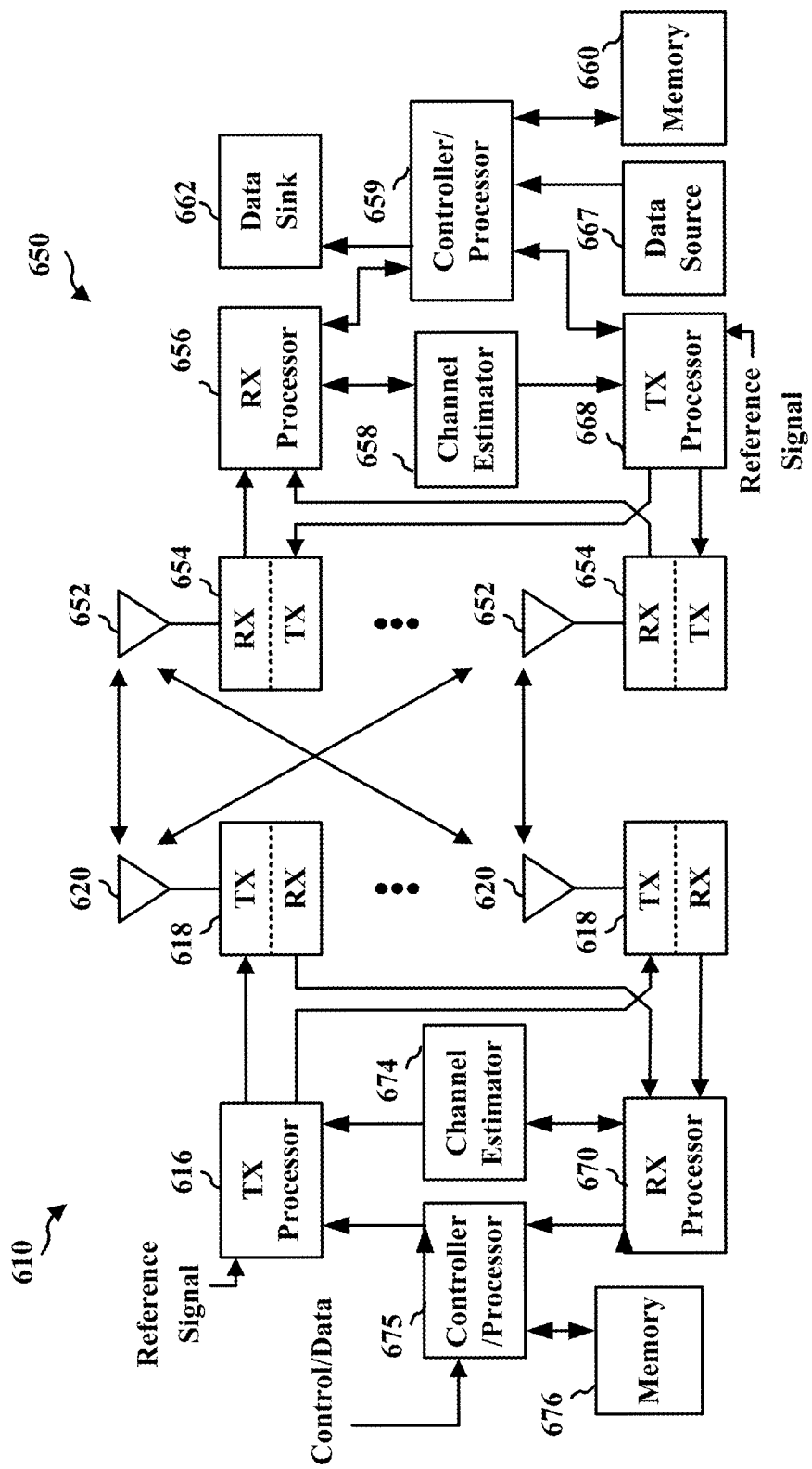

FIG. 6 is a diagram illustrating an example of an evolved Node B and user equipment in an access network.

Figures 7A, 7B:
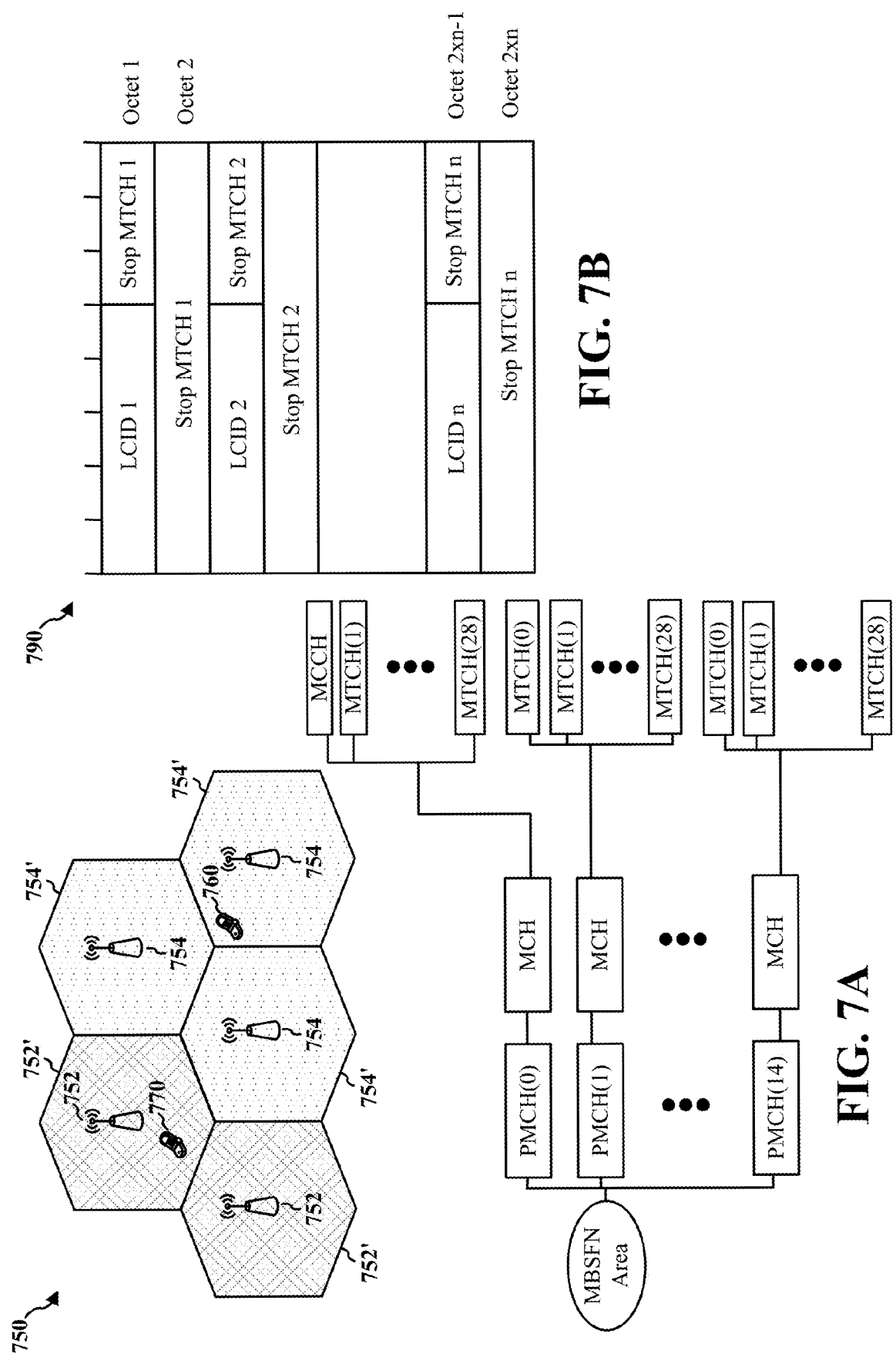

FIG. 7A is a diagram illustrating an example of an evolved Multimedia Broadcast

Multicast Service channel configuration in a Multicast Broadcast Single Frequency Network.

FIG. 7B is a diagram illustrating a format of a Multicast Channel Scheduling

Information (MSI) Media Access Control (MAC) control element.

Figure 8:
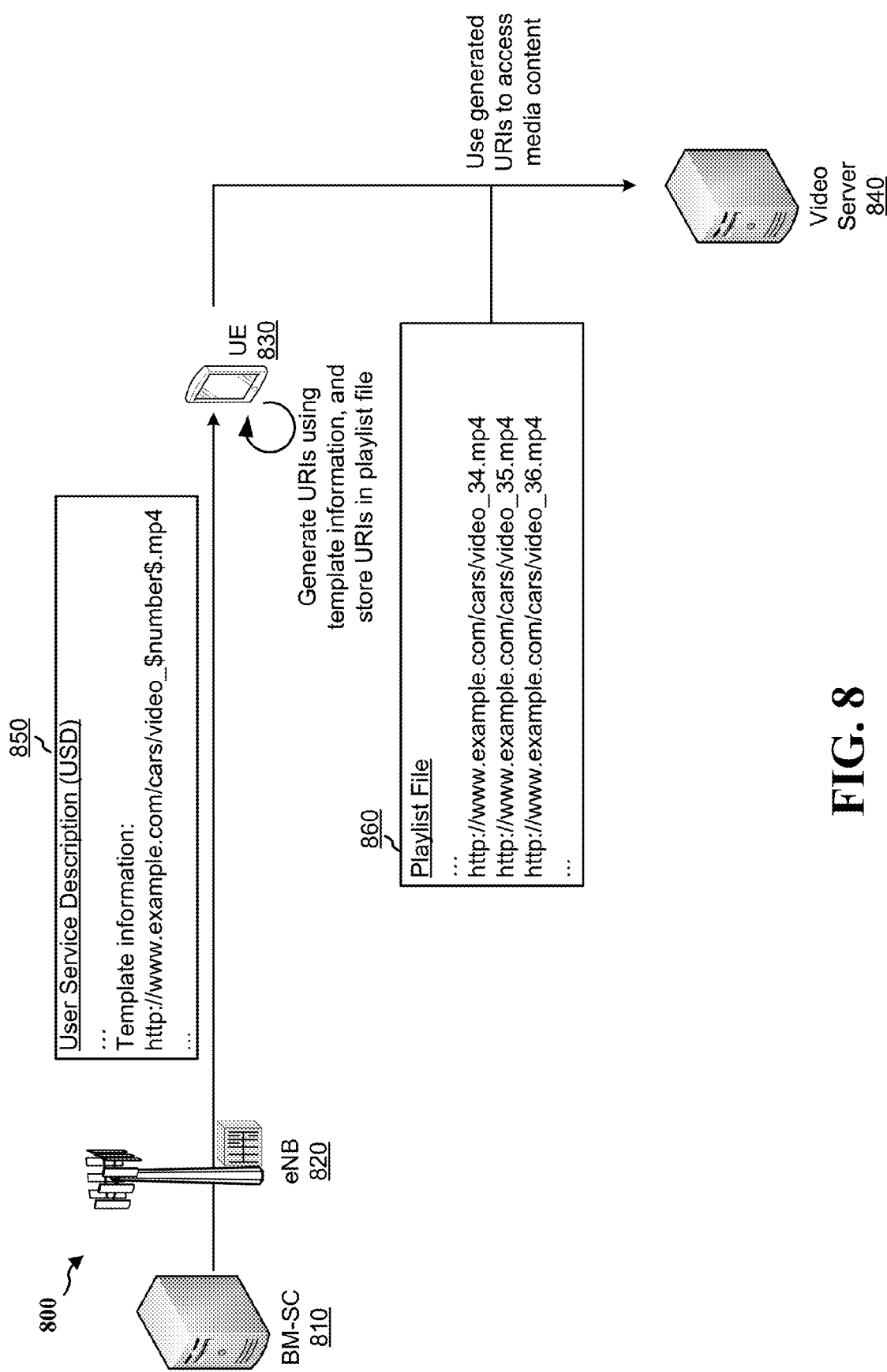

FIG. 8 is a diagram illustrating an example system configured to enable HLS over eMBMS.

Figure 9:
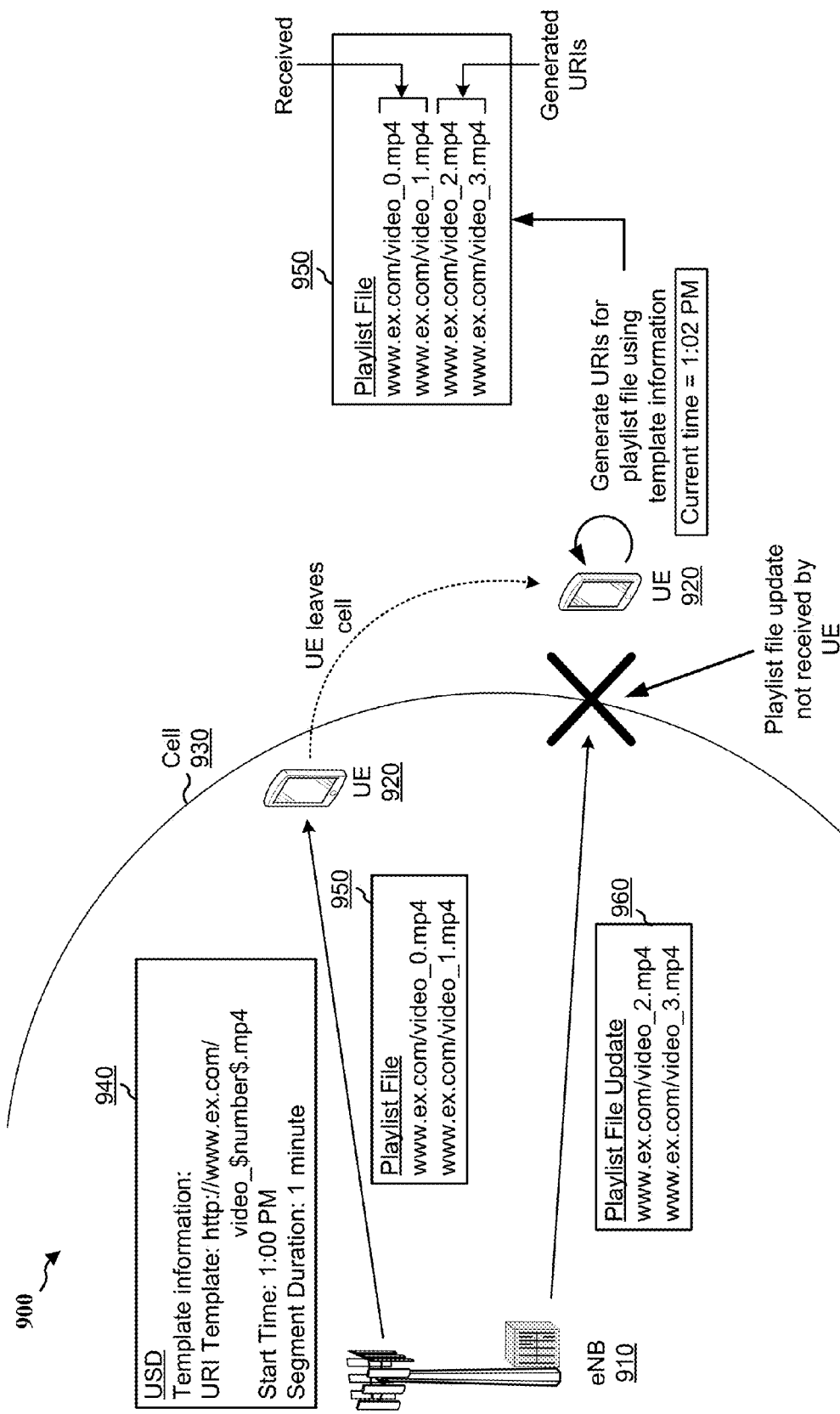

FIG. 9 is a diagram illustrating another example system configured to enable HLS over eMBMS.

Figure 10A:
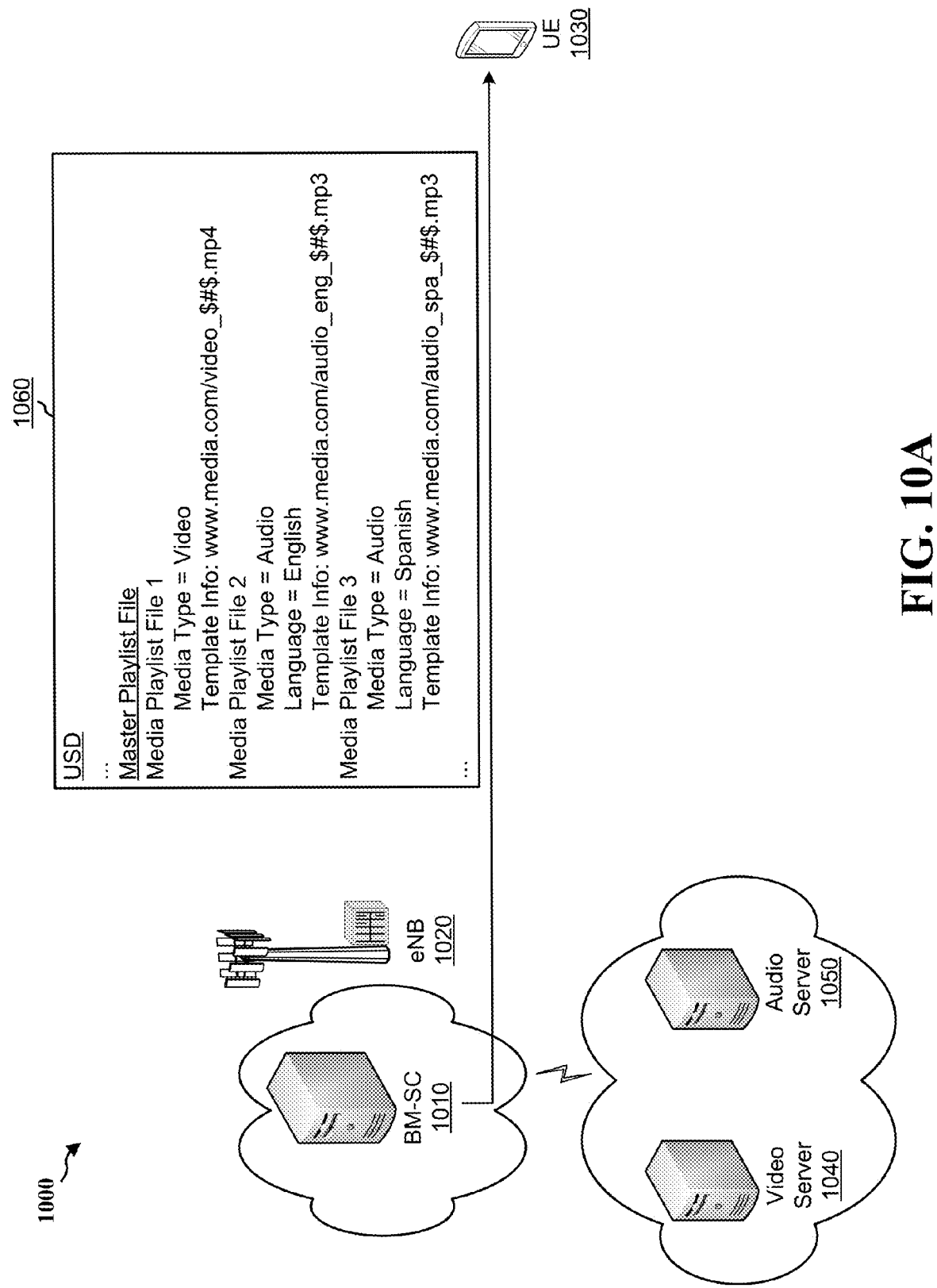
Figure 10B:
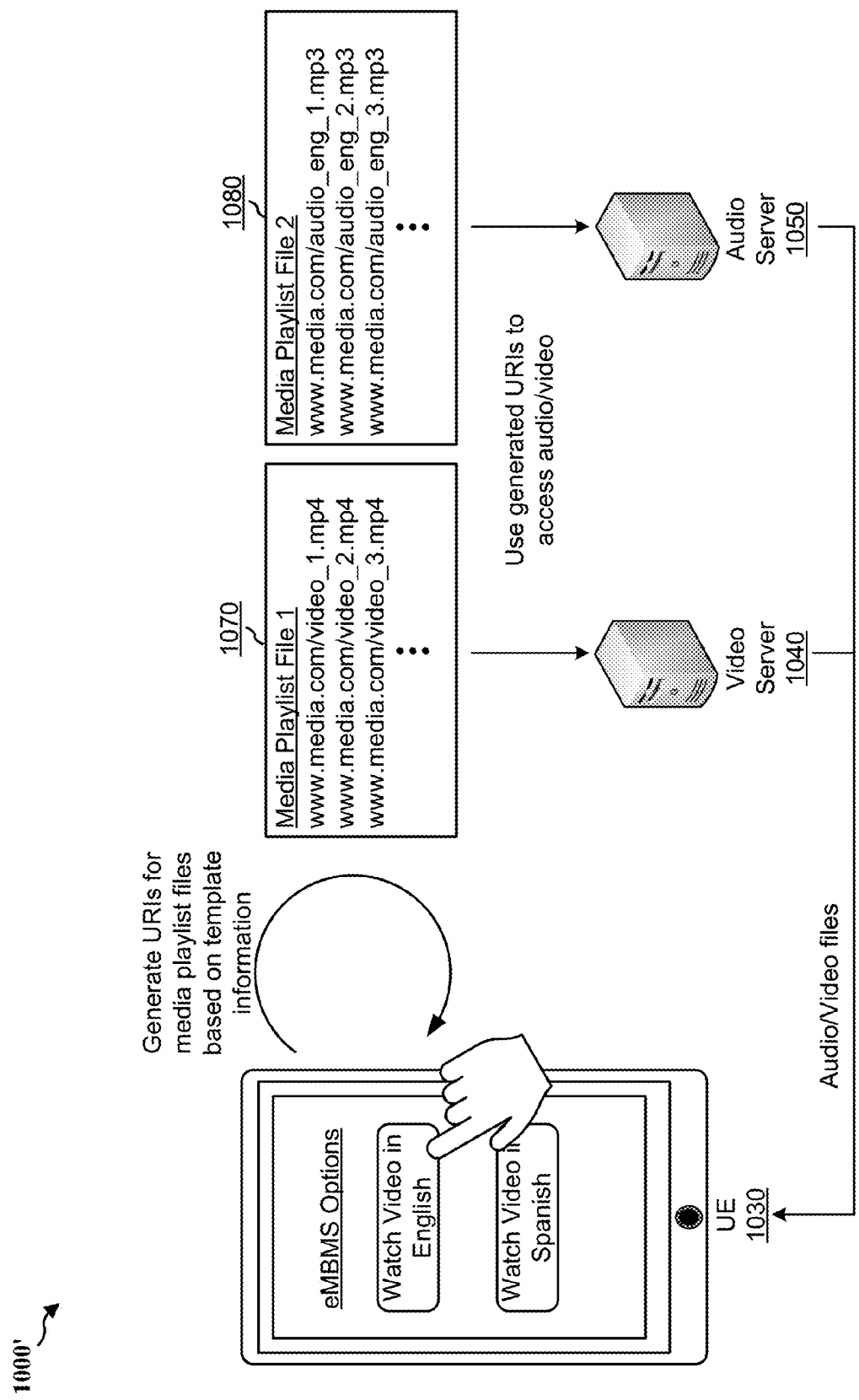

FIGS. 10A and 10B are diagrams illustrating additional example systems configured to enable HLS over eMBMS.

Figure 11:
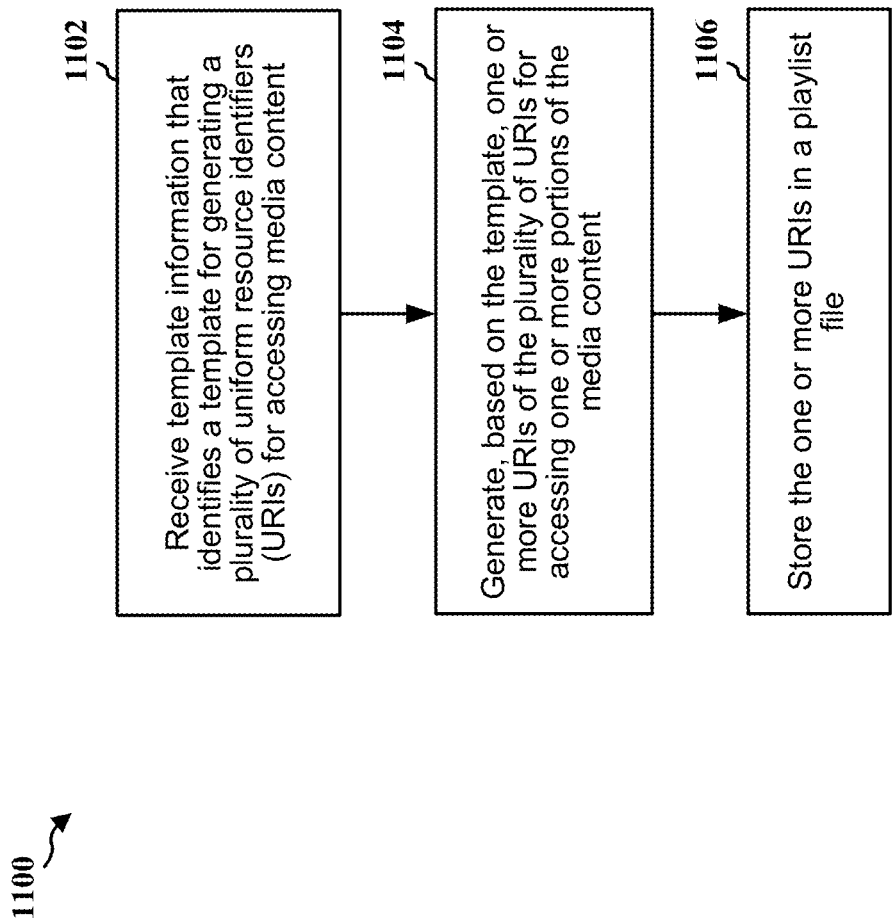

FIG. 11 is a flow chart of a method of wireless communication.

Figure 12:
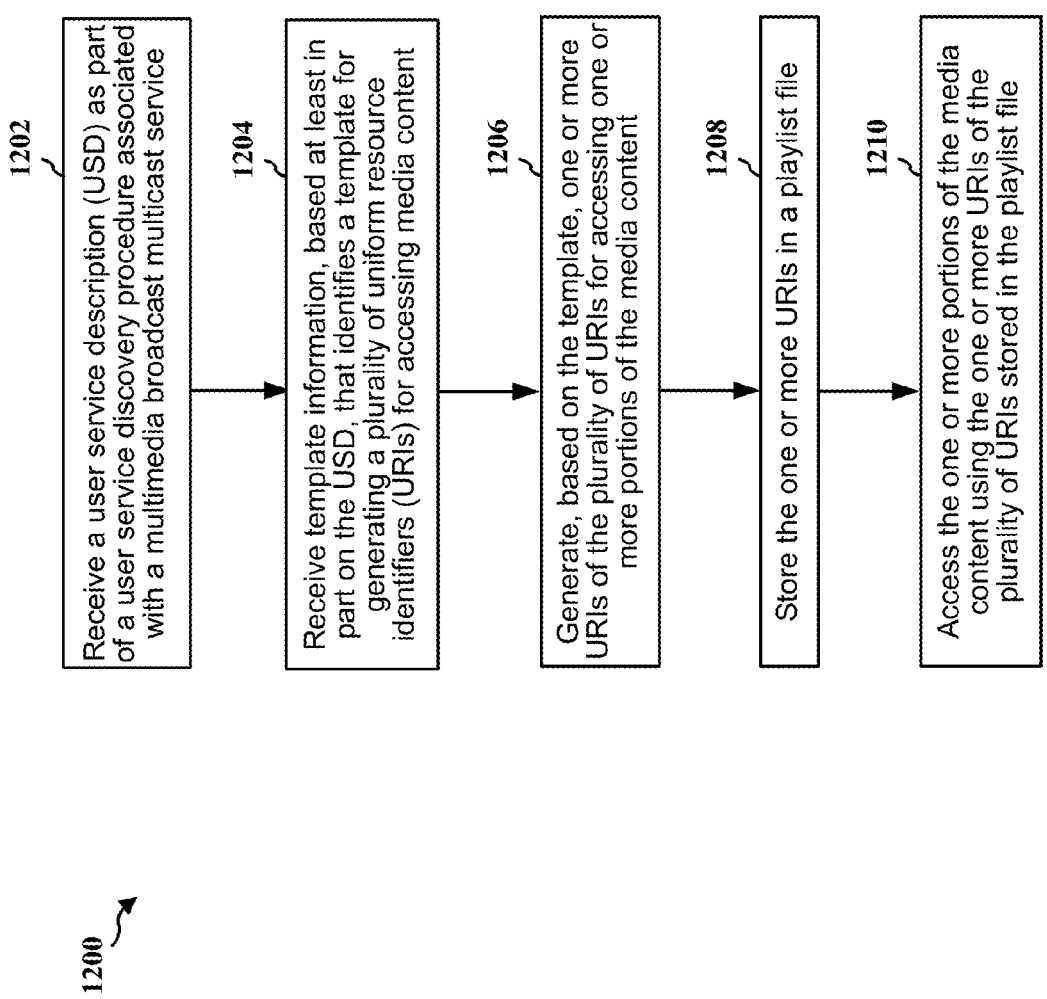

FIG. 12 is a flow chart of a method of wireless communication.

Figure 13:
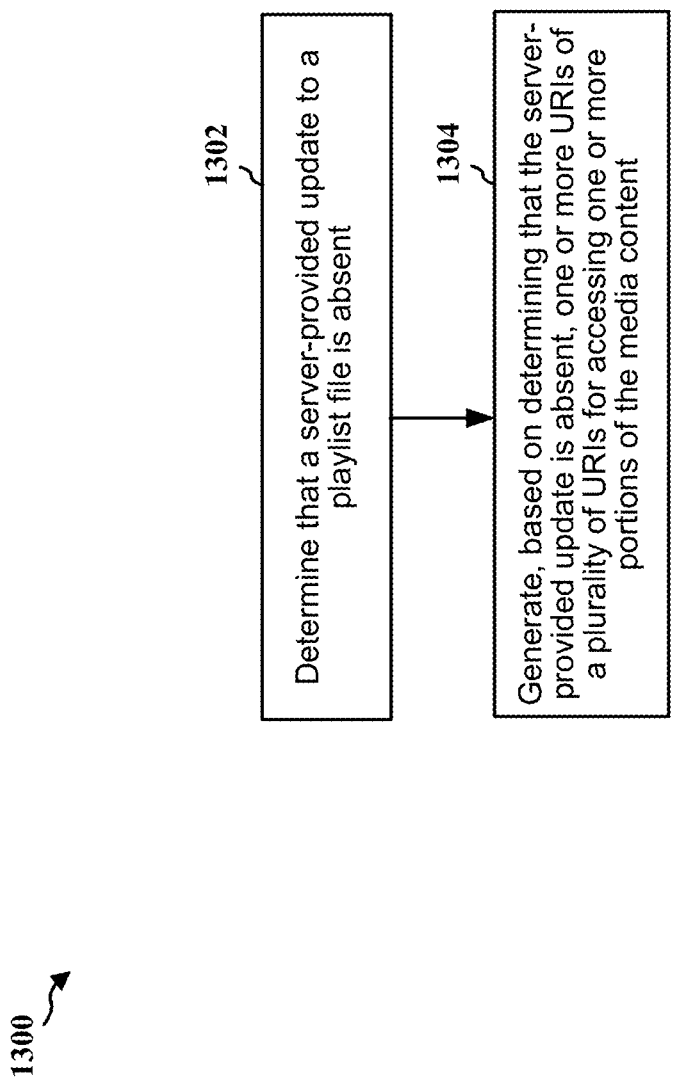

FIG. 13 is a flow chart of a method of wireless communication.

Figure 14:
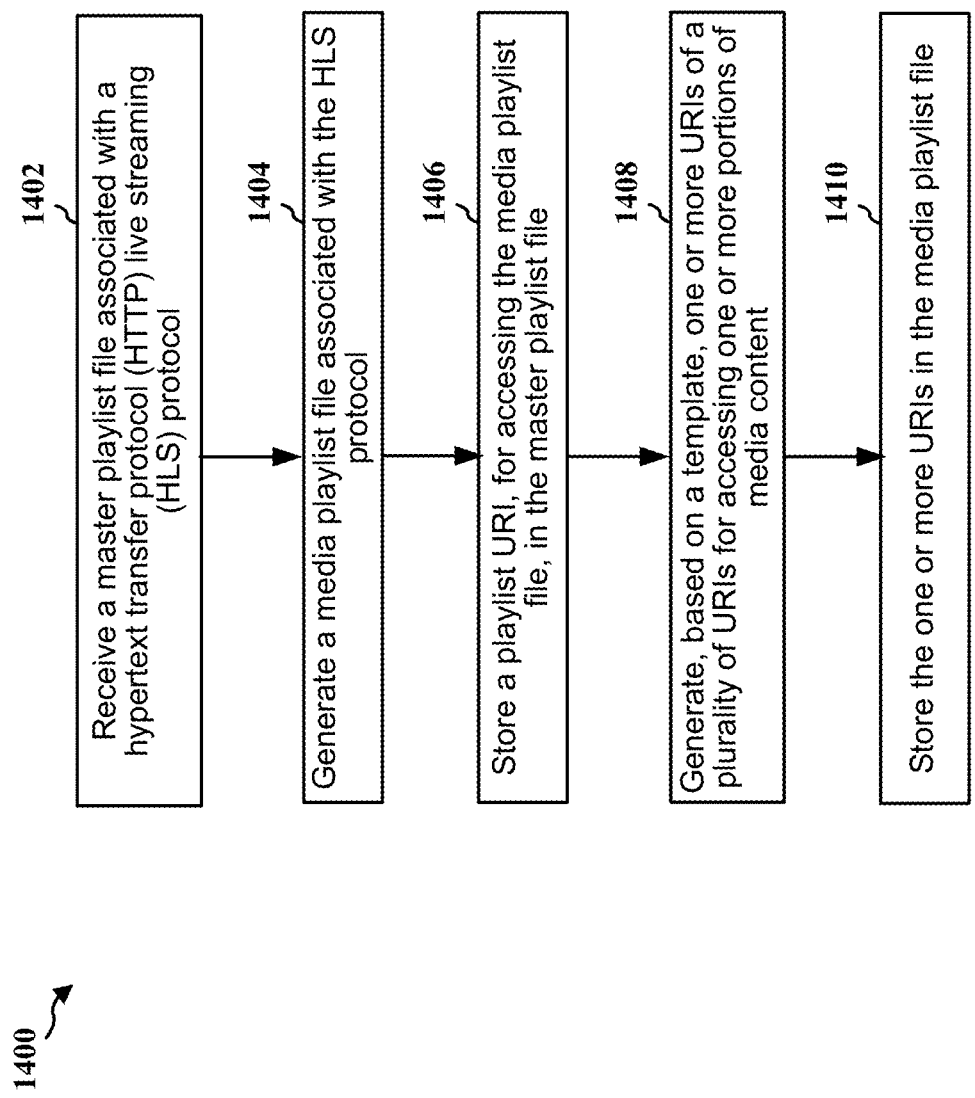

FIG. 14 is a flow chart of a method of wireless communication.

Figure 15:
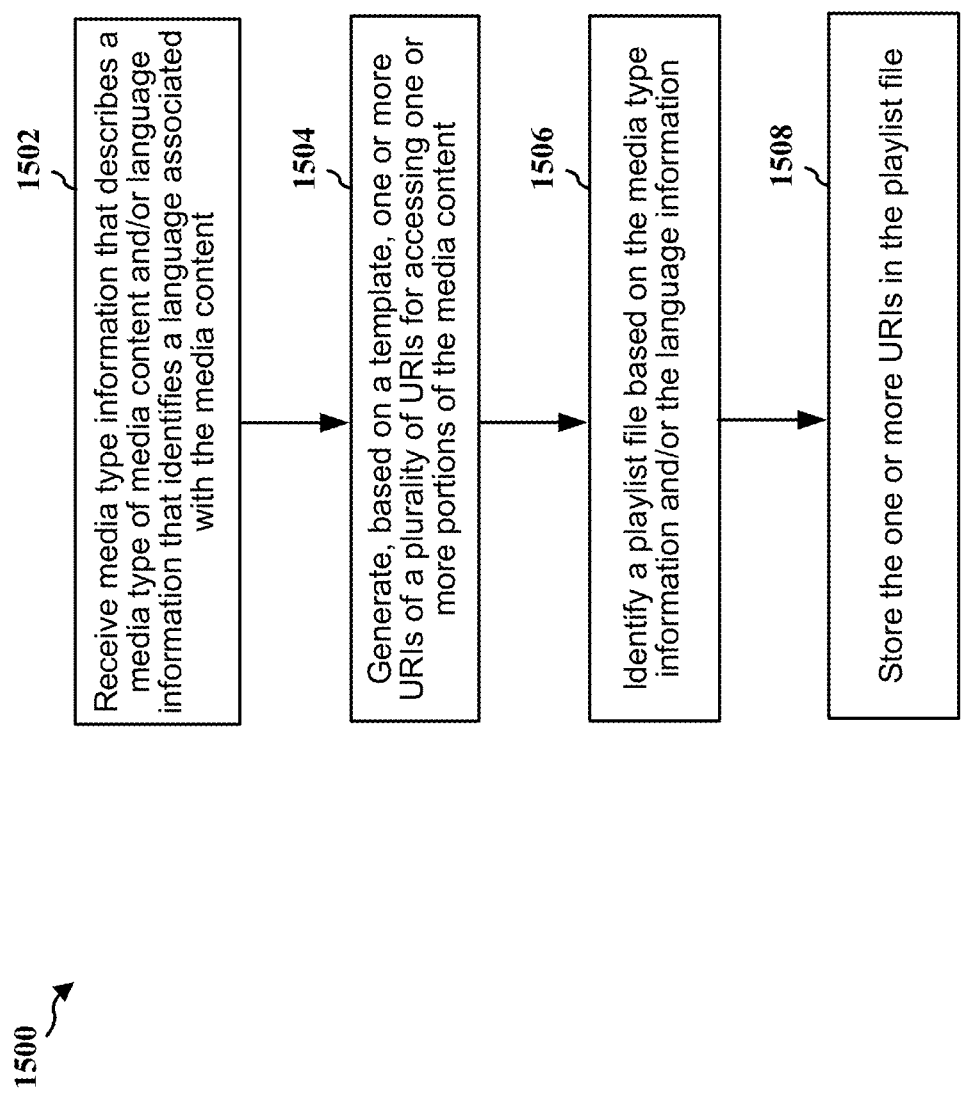

FIG. 15 is a flow chart of a method of wireless communication.

Figure 16:
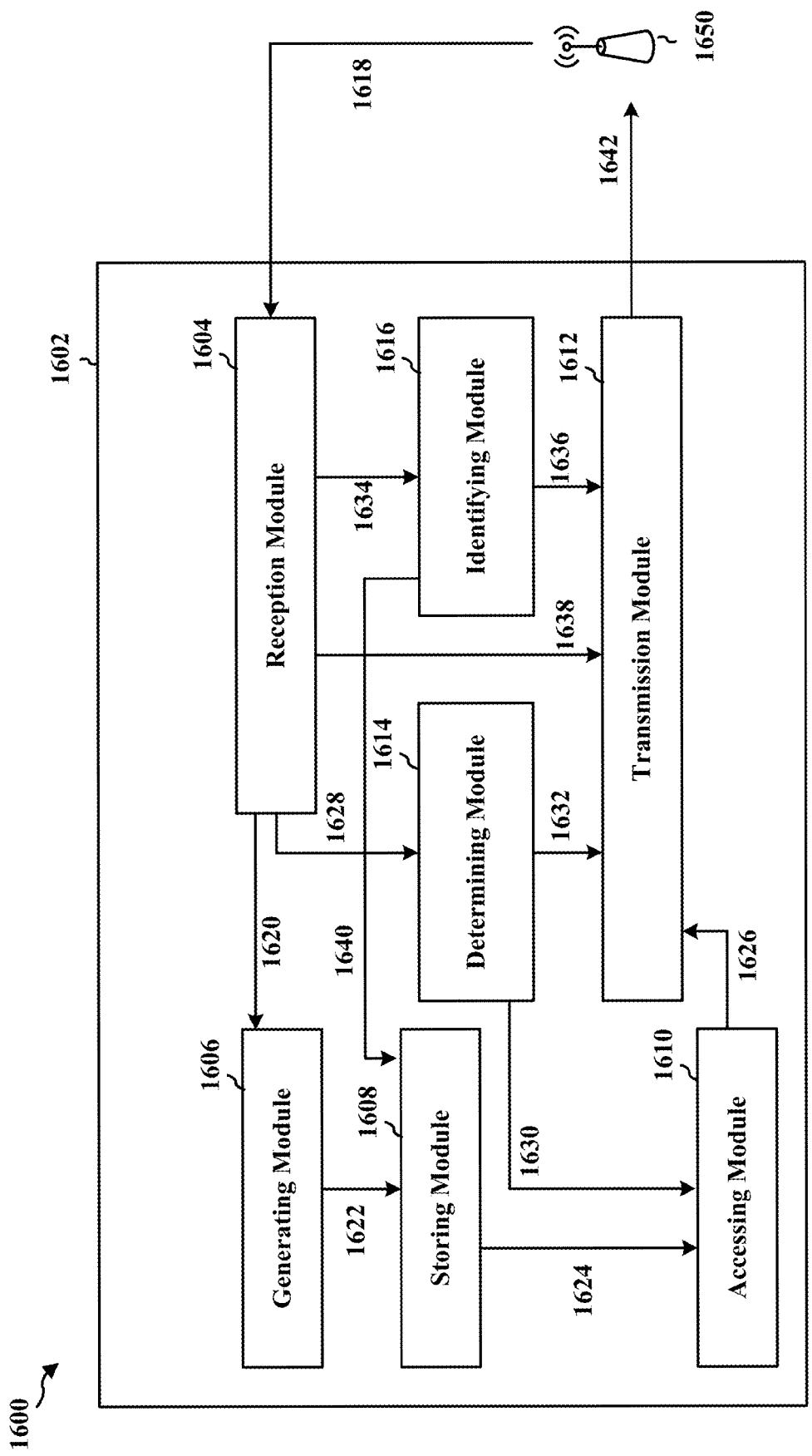

FIG. 16 is a conceptual data flow diagram illustrating the data flow between different modules/means/components in an exemplary apparatus.

Figure 17:
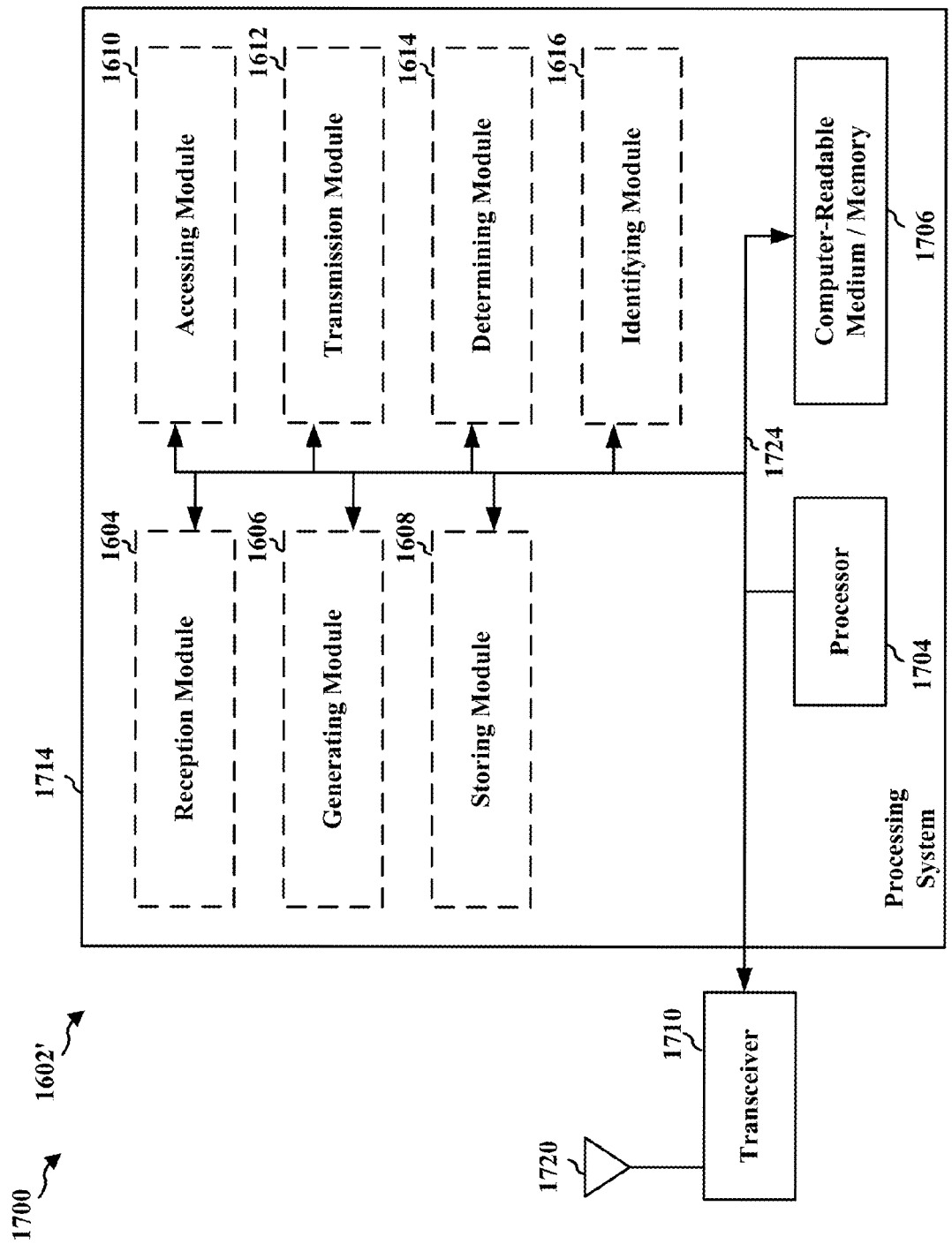

FIG. 17 is a diagram illustrating an example of a hardware implementation for an apparatus employing a processing system.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Figure 1:
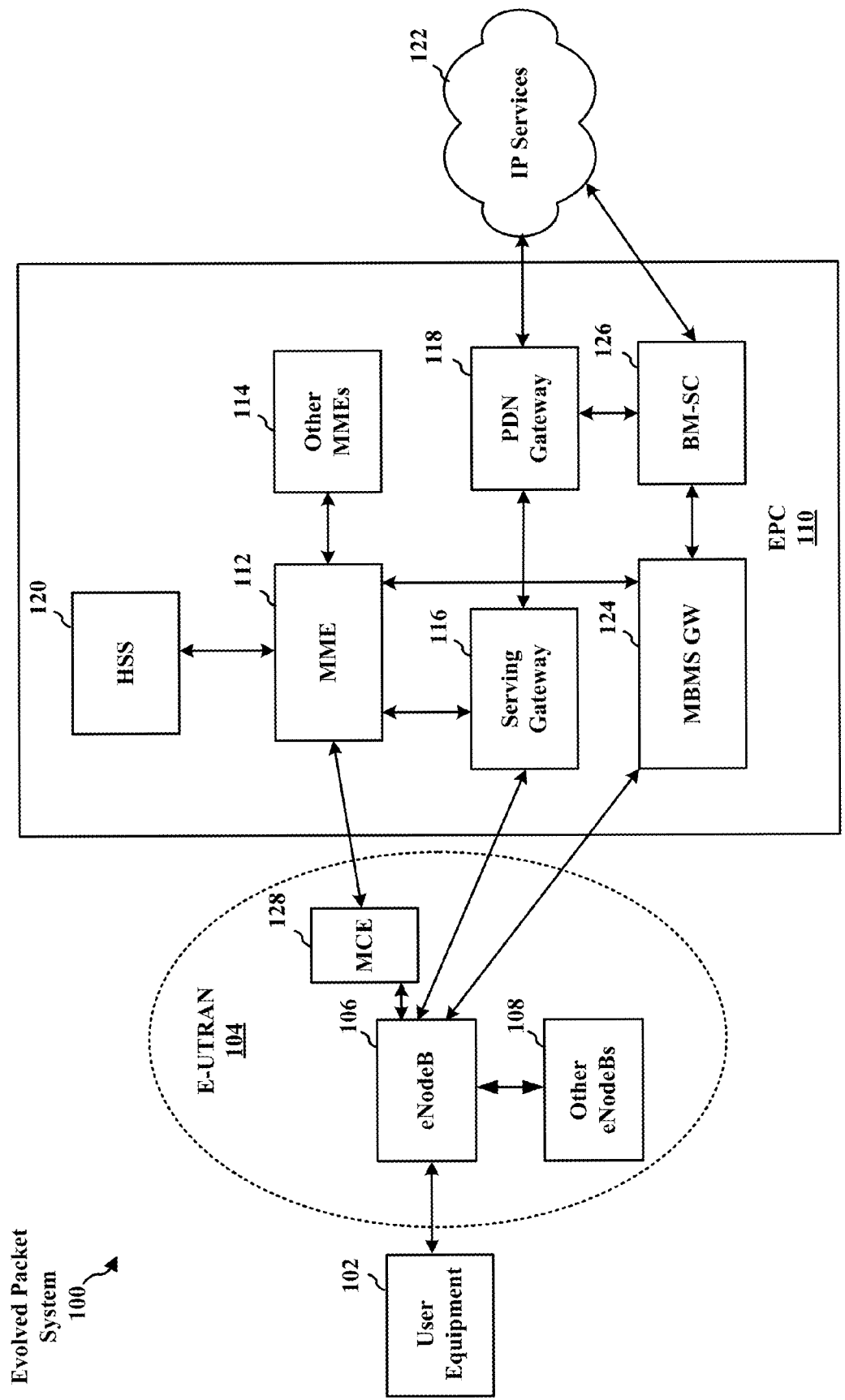
FIG. 1 is a diagram illustrating an example of a network architecture.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
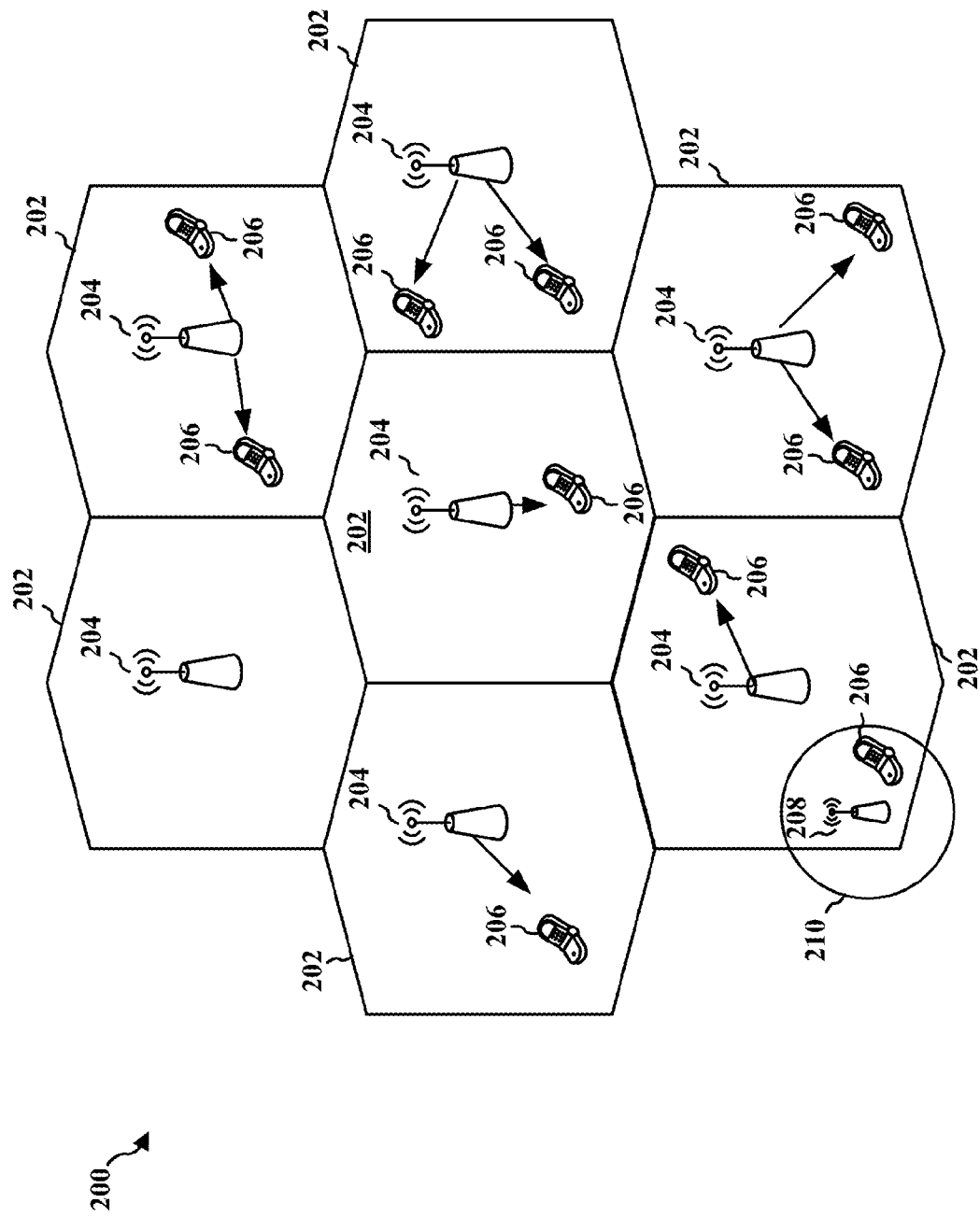
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
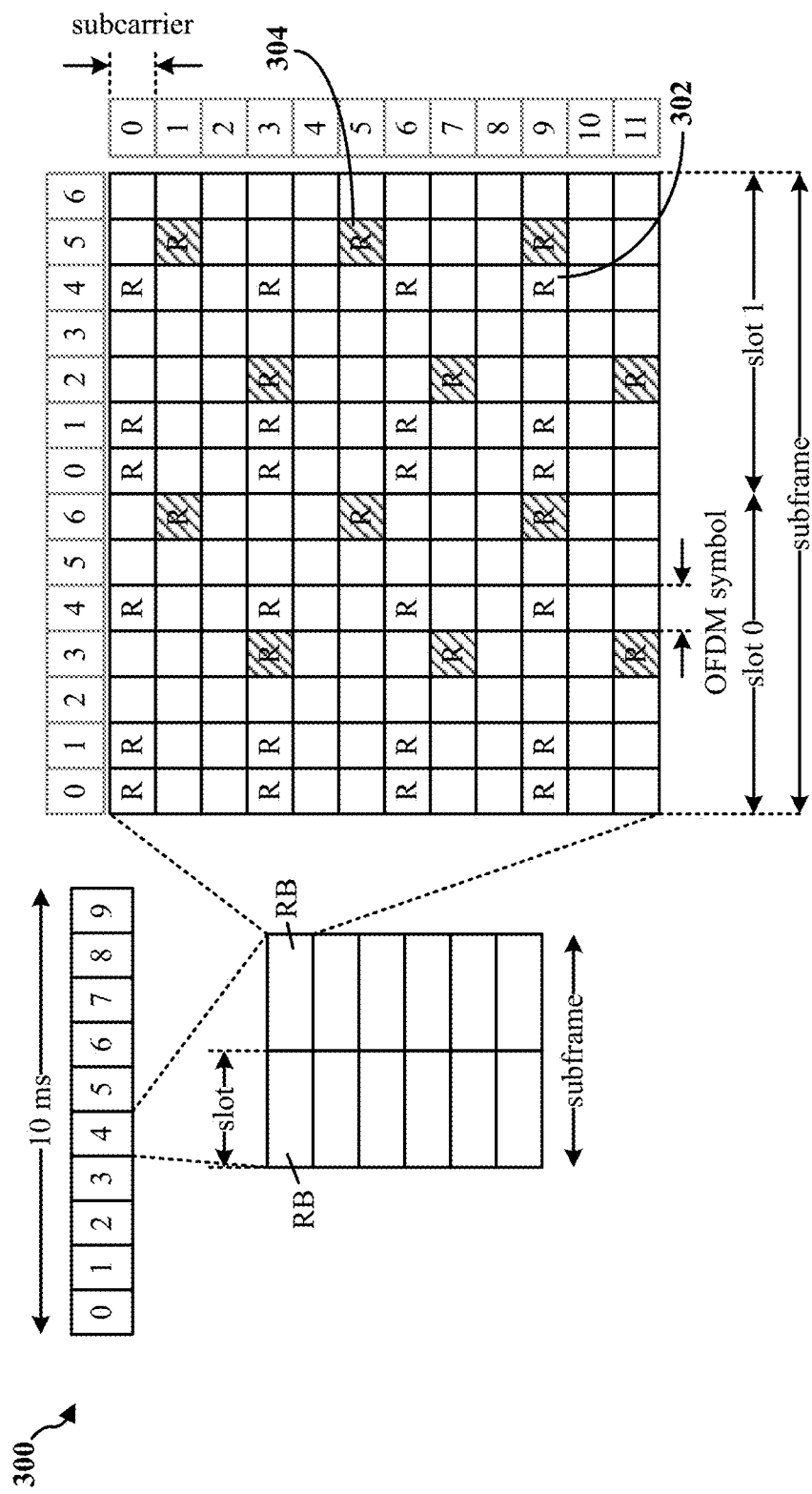

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports one or more physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a system information block (SIB) 13(SIB13). Subsequently, based on the SIB13, the UE may acquire an MBSFN Area Configuration message on an MCCH. Subsequently, based on the MBSFN Area Configuration message, the UE may acquire an MCH scheduling information (MSI) MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

In HLS, a UE may achieve media playback by retrieving media segments over HTTP, and by playing the media segments in the correct order. The UE may use a playlist file, that includes URIs of the media segments, to identify locations where the media segments may be accessed and an order in which the media segments are to be played. When live content is being broadcast or multicast (e.g., via eMBMS), the playlist file may be updated frequently as the media segments are generated, as media segments are removed to keep the playlist file size small (e.g., because all UEs are likely playing the same file or the same few files of live content, old files may be removed from the playlist), or the like. When the playlist file is updated, the update may be broadcast or multicast to UEs using eMBMS. However, if the UE loses communication with an eNB that is broadcasting or multicasting the update to the playlist file, the UE may not receive the update to the playlist file. In this case, the UE may not be able to identify a media segment to be retrieved because the playlist file has not been updated to include a URI for the media segment. When this happens, playback of the media content may stall. Techniques described herein assist a UE in preventing stalling of playback of media content by providing a template for the UE to use to generate URIs for media segments. The UE may generate the URIs so that the media segments may be identified and retrieved even if the UE fails to receive the URIs via an update to a playlist file (e.g., because the UE has lost communication with an eNB). Further details are described herein.

FIG. 8 is a diagram illustrating an example system 800 configured to enable HLS over eMBMS. As shown in FIG. 8, example system 800 may include a BM-SC 810 (e.g., which may include the BM-SC 126 of FIG. 1, etc.), an eNB 820 (e.g., which may include one or more of the eNBs 106, 108 of FIG. 1, the eNBs 204, 208 of FIG. 2, the eNB 610 of FIG. 6, the eNBs 752, 754 of FIG. 7, etc.), a UE 830 (e.g., which may include one or more of the UE 102 of FIG. 1, the UE 206 of FIG. 2, the UE 650 of FIG. 6, the UEs 760, 770 of FIG. 7, etc.), and a video server 840.

As shown in FIG. 8, the BM-SC 810 may provide, via the eNB 820, a user service description (USD) 850 to the UE 830. The USD 850 may include template information that identifies a template for generating a plurality of uniform resource identifiers (URIs) for accessing media content (e.g., streaming video, streaming audio, etc.). The template may identify a static portion that is the same for each URI, shown as "http://www.example.com/cars/video_" and ".mp4." The template may also identify a dynamic portion that is different for each URI, shown as "$number$."

The UE 830 (e.g., middleware executing on the UE 830) may use the template to generate URIs, and may store the URIs in a playlist file 860. In some aspects, middleware, executing on the UE 830, may provide the playlist file 860 to an HLS client of the UE 830 so that the URIs may be used to access the media content (e.g., by the HLS client). In some aspects, the HLS client may receive or retrieve the playlist file 860 from the middleware, and may use the URIs stored in the playlist file 860 to access the media content. In this way, if UE 830 fails to receive the playlist file 860 and/or an update to the playlist file 860 that includes URIs for accessing the media content, the UE 830 may generate the URIs based on the template. For example, and as shown, the UE 830 may substitute numbers for the dynamic portion of the URI (e.g., "$number$") for consecutive URIs, shown as "http://www. example. com/cars/video_34. mp4," "http:// www. example. com/cars/video_35. mp4," and "http://www. example. com/cars/video_36. mp4." As shown, the UE 830 may use the generated URIs to access the media content (e.g., from the video server 840). By generating the URIs used to access the media content, the UE 830 may prevent interruption in playback of the media content due to a failure to receive the URIs (e.g., when the UE 830 is outside a range of the eNB 820, when the UE 830 loses communication with the eNB 820, etc.).

As indicated above, system 800 depicted in FIG. 8 is provided as an example. Other examples are possible and may differ from what was described in connection with FIG. 8.

FIG. 9 is a diagram illustrating another example system 900 configured to enable HLS over eMBMS. As shown in FIG. 9, example system 900 may include an eNB 910 (e.g., which may include one or more of the eNBs 106, 108 of FIG. 1, the eNBs 204, 208 of FIG. 2, the eNB 610 of FIG. 6, the eNBs 752, 754 of FIG. 7, the eNB 820 of FIG. 8, etc.), a UE 920 (e.g., which may include one or more of the UE 102 of FIG. 1, the UE 206 of FIG. 2, the UE 650 of FIG. 6, the UEs 760, 770 of FIG. 7, the UE 830 of FIG. 8, etc.), and a cell 930 (e.g., which may include one or more of the cells 202, 210 of FIG. 2, the cells 752', 754' of FIG. 7, etc.) associated with the eNB 910.

As shown in FIG. 9, the eNB 910 may provide a user service description (USD) 940 to the UE 920. The USD 940 may be received by the UE 920 as part of a user service discovery procedure associated with a multimedia broadcast multicast service (e.g., eMBMS). The USD 940 may include template information that identifies a template for generating a plurality of uniform resource identifiers (URIs) for accessing media content (e.g., streaming video, streaming audio, etc.). As described above in connection with FIG. 8, the template may identify a static portion that is the same for each URI, shown as "http://www.ex.com/video_" and ".mp4," and a dynamic portion that is different for each URI, shown as "$number$." As further shown, the USD 940 may indicate a schedule for the media content, such as a start time for the media content, shown as 1:00 PM (e.g., a time that a broadcast begins, a time that a multicast begins, etc.), and a segment duration of a media segment identified by a URI, shown as 1 minute (e.g., each media segment may be 1 minute in length).

As further shown, the eNB 910 may transmit a playlist file 950 that includes URIs with dynamic portions that include the numbers 0 and 1 (e.g., "www.ex.com/video_0.mp4" and "www.ex.com/video_1.mp4"). The UE 920 may receive the playlist file 950. At a later time, the eNB 910 may transmit a playlist file update 960 (e.g., to update playlist file 950) that includes additional URIs with dynamic portions that include the numbers 2 and 3 (e.g., "www.ex.com/ video_2.mp4" and "www.ex.com/video_3.mp4"). At that time, assume that the UE 920 has left the cell 930, and fails to receive the playlist file update 960. Thus, the UE 920 would be unable to access media segments associated with the URIs included in the playlist file update 960 without using the techniques described herein.

As further shown, the UE 920 may use the template information (e.g., the URI template, the start time, and the segment duration) to generate one or more URIs for accessing the media content. In some aspects, the UE 920 may compare a current time to the start time to generate a URI. For example, the UE 920 may generate, based on the start time of 1:00 PM, the segment duration of 1 minute, and the current time of of 1:02 PM, a URI "www.ex.com/ video_2.mp4" (e.g., a dynamic portion of 0 for the URI of the media segment associated with the first minute, a dynamic portion of 1 for the URI of the media segment associated with the second minute, and a dynamic portion of 2 for the URI of the media segment associated with the third minute). As further shown, the UE 920 may generate a URI of "www.ex.com/video_3.mp4" for a media segment associated with the fourth minute of the URI.

Additionally, or alternatively, the UE 920 may generate the URIs based on determining that a server-provided URI is absent from the playlist file (e.g., before playback of the media content, during playback of the media content, etc.). For example, during playback of "video_1.mp4," the UE 920 may determine that a URI for a next file (e.g., "video_2.mp4") is absent from the playlist file. Based on the length of the media content (e.g., which may be indicated in the USD 940), the UE 920 may determine that a URI for "video_2.mp4" should be in the playlist file 950, and may generate the URI based on this determination (e.g., may generate the URI of "www.ex.com/video_2.mp4").

The UE 920 may store the generated URIs in the playlist file 950, and may use the generated URIs to access media segments of the media content. In this way, the UE 920 may access media segments of a communication (e.g., a broadcast communication, a multicast communication, an eMBMS communication, etc.) even when URIs of the media segments are not received from the eNB 910. For example, the UE 920 may fail to receive server-generated URIs (e.g., generated by a BM-SC, a video server, an audio server, etc.) from the eNB 910 because the UE 920 has left the cell 930 associated with the eNB 910, because the UE 920 has lost a connection with the eNB 910, or the like. In this case, the UE 920 may generate the URIs, and may use the generated URIs to access the media segments when the UE 920 re-enters the cell 930 and/or transitions to another cell. In this way, the UE 920 may improve a user experience (e.g., by permitting continuous playback of content), may conserve network resources (e.g., by permitting a reduced number of transmission of playlist file updates, by eliminating server transmissions of playlist files or playlist file updates because the UE has the template information to generate the URIs instead of receiving the URIs from the server, etc.), or the like.

In some aspects, the UE 920 may receive the template information (e.g., the URI template, the schedule, etc.) as part of a multimedia broadcast multicast service (e.g., eMBMS). For example, the UE 920 may receive the USD 940 as part of a user service discovery procedure in eMBMS, as part of a user service announcement, or the like. In some aspects, the UE 920 may access the media content, using the generated URIs, via the multimedia broadcast multicast service. In some aspects, the UE 920 may access the media content, using the generated URIs, via a unicast service. In this way, the UE 920 may permit continuous playback of content even if communication is lost between UE 920 and the multimedia broadcast multicast service.

As indicated above, system 900 depicted in FIG. 9 is provided as an example. Other examples are possible and may differ from what was described in connection with FIG. 9.

FIGS. 10A and 10B are diagrams illustrating additional example systems 1000 and 1000' which are configured to enable HLS over eMBMS. As shown in FIGS. 10A and 10B, example systems 1000 and 1000' may include a BM-SC 1010 (e.g., which may include one or more of the BM-SC 126 of FIG. 1, the BM-SC 810 of FIG. 8, etc.), an eNB 1020 (e.g., which may include one or more of the eNBs 106, 108 of FIG. 1, the eNBs 204, 208 of FIG. 2, the eNB 610 of FIG. 6, the eNBs 752, 754 of FIG. 7, the eNB 820 of FIG. 8, the eNB 910 of FIG. 9, etc.), a UE 1030 (e.g., which may include one or more of the UE 102 of FIG. 1, the UE 206 of FIG. 2, the UE 650 of FIG. 6, the UEs 760, 770 of FIG. 7, the UE 830 of FIG. 8, the UE 920 of FIG. 9, etc.), a video server 1040 (e.g., which may include the video server 840 of FIG. 8, etc.), and an audio server 1050.

As shown in FIG. 10A, the BM-SC 1010 may provide, via the eNB 1020, a user service description (USD) 1060 to the UE 1030. The USD 1060 may include a master playlist file that includes information for multiple media playlist files. A media playlist file may include template information that identifies a template for generating a plurality of uniform resource identifiers (URIs) for accessing media content associated with the media playlist file. Additionally, or alternatively, a media playlist file may be associated with a media type, such as video, audio, text, or the like. Additionally, or alternatively, a media playlist file may be associated with a language, such as English, Spanish, Chinese, Japanese, or the like.

As shown, a first media playlist file (e.g., "Media Playlist File 1") may have a media type of video, and may include template information that identifies a static portion of URIs associated with the first media playlist file (e.g., "www.media.com/video_" and ".mp4") and a dynamic portion of URIs associated with the first media playlist file (e.g., "$#$," where each URI has a different number between the $ characters).

A second media playlist file (e.g., "Media Playlist File 2") may have a media type of audio, and the audio may be in English. The second media playlist file may include template information that identifies a static portion of URIs associated with the second media playlist file (e.g., "www.media.com/audio_eng_" and ".mp3") and a dynamic portion of URIs associated with the second media playlist file (e.g., "$#$," where each URI has a different number between the $ characters).

A third media playlist file (e.g., "Media Playlist File 3") may have a media type of audio, and the audio may be in Spanish. The third media playlist file may include template information that identifies a static portion of URIs associated with the third media playlist file (e.g., "www.media.com/audio_spa_" and ".mp3") and a dynamic portion of URIs associated with the third media playlist file (e.g., "$#$," where each URI has a different number between the $ characters).

As shown, the UE 1030 may receive the USD 1060, including the master playlist file and the media playlist files, via the eNB 1020. In some aspects, the USD 1060, the master playlist file, and/or a media playlist file may include playlist information, such as a duration of one or more portions (e.g., segments) of the media content, a version of a protocol associated with a playlist file, a starting media sequence identifier (e.g., a starting media sequence number) associated with a playlist file, or the like. The UE 1030 may use the playlist information when generating a playlist file (e.g., a media playlist file) and/or one or more URIs to be stored in the playlist file.

As shown in FIG. 10B, the UE 1030 may receive user input indicating one or more parameters of media content to be accessed by the UE 1030. For example, assume that the user provides input indicating that the user wishes to watch a video in English. Based on this user input, which identifies a media type (e.g., video and audio associated with the video) and a language (e.g., English), the UE 1030 may generate URIs for media playlist files based on the template information.

In this case, the UE 1030 may generate URIs for a first media playlist file 1070 (e.g., "Media Playlist File 1") for the video, and URIs for a second media playlist file 1080 (e.g., "Media Playlist File 2") for the English audio. For example, and as shown, the UE 1030 may use the template to generate URIs of "www.media.com/video_1.mp4," "www.media.com/video_2.mp4," "www.media.com/video_3.mp4," and so on for the first media playlist file 1070. As further shown, the UE 1030 may use the template to generate URIs of "www.media.com/audio_eng_1.mp3," "www.media.com/audio_eng_2.mp3," "www.media.com/audio_eng_2.mp3," and so on for the second media playlist file 1080.

As shown, the UE 1030 may use the generated URIs from the first media playlist file 1070 to access video content from the video server 1040, and may use the generated URIs from the second media playlist file 1080 to access English audio content (e.g., associated with the video content) from the audio server 1050. In this way, the UE 1030 may use a template to generate URIs for accessing different media types, different languages, etc. for media content, such that the UE 1030 may access the media content even if the URIs are not received from a server that generates the URIs (e.g., via an eNB that broadcasts and/or multicasts the URIs).

As indicated above, example systems 1000 and 1000' depicted in FIGS. 10A and 10B are provided as an example. Other examples are possible and may differ from what was described in connection with FIGS. 10A and 10B.

FIG. 11 is a flow chart 1100 of a method of wireless communication. In some aspects, the method may be performed by a UE (e.g., one or more of the UE 102 of FIG. 1, the UE 206 of FIG. 2, the UE 650 of FIG. 6, the UEs 760, 770 of FIG. 7, the UE 830 of FIG. 8, the UE 920 of FIG. 9, the UE 1030 of FIGS. 10A and/or 10B, the apparatus 1602 of FIG. 16, the apparatus 1602' of FIG. 17, etc.).

At 1102, the UE may receive template information that identifies a template for generating a plurality of uniform resource identifiers (URIs) for accessing media content. For example, as described above in connection with FIG. 8, the UE 830 may receive the template information from the eNB 820 (e.g., as part of USD 850). The template information may identify a template for generating a plurality of URIs for accessing media content. For example, the template information may identify a URI template that includes a static portion for the URIs and a dynamic portion for the URIs. The static portion may indicate a character string that is the same for different URIs. The dynamic portion may indicate a character string that is different for different URIs (e.g., that is unique for each URI). The template information may include information describing how to generate the dynamic portion of the URI. For example, the dynamic portion may include a time (e.g., in seconds, milliseconds, etc.) that is included in consecutive URIs that are generated at periodic intervals, a number in a sequence (e.g., that is incremented by a particular amount for dynamic portions of consecutive URIs), or the like. The time may include, for example, a current time, an amount of time that has elapsed from a start time of a broadcast, or the like. A URI may be associated with a media segment (e.g., a portion of media content that is less than an entirety of the media content), such as a video segment, an audio segment, a text segment, or the like.

At 1104, the UE may generate, based on the template, one or more URIs of the plurality of URIs for accessing one or more portions of the media content. For example, as described above in connection with FIG. 8, the UE 830 may use the template to generate one or more URIs for accessing one or more portions of the media content. The generated URIs may include the static portion, which may be the same for each generated URI, and the dynamic portion, which may be different for each generated URI.

At 1106, the UE may store the one or more URIs in a playlist file. For example, as described above in connection with FIG. 8, the UE 830 may store the one or more URIs in the playlist file 860 (e.g., in an order that indicates a sequence in which the URIs are to be used to access media segments). In some aspects, the UE 830 may receive the playlist file 860 (e.g., from the eNB 820) based on a user service announcement (e.g., associated with eMBMS), and may store the one or more URIs in the playlist file 860. In some aspects, the UE 830 may generate the playlist file 860.

In some aspects, the playlist file 860 may include playlist information, such as a duration of one or more portions (e.g., segments) of the media content, a version of a protocol associated with a playlist file, a starting media sequence identifier associated with a playlist file, or the like. In some aspects, the UE 830 may receive the playlist information based at least in part on a user service announcement, and may store the playlist information in the playlist file 860. The UE 830 may use the playlist information when generating the playlist file 860 and/or when generating one or more URIs to be stored in the playlist file 860.

The UE 830 may use the generated URIs, stored in the playlist file 860, to access portions of the media content (e.g., from the video server 840 and/or another device). For example, middleware executing on the UE 830 may provide the playlist file 860 to an HLS client executing on the UE 830. The HLS client may use the generated URIs, stored in the playlist file 860, to access the portions of the media content. In this way, if the UE 830 fails to receive an update to the playlist file 860 (e.g., an update that identifies one or more URIs to be included in the playlist file 860), the UE 830 may generate the URIs that were not received, and may continue to access and play the media content (e.g., in a seamless manner).

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

FIG. 12 is a flow chart 1200 of a method of wireless communication. In some aspects, the method may be performed by a UE (e.g., one or more of the UE 102 of FIG. 1, the UE 206 of FIG. 2, the UE 650 of FIG. 6, the UEs 760, 770 of FIG. 7, the UE 830 of FIG. 8, the UE 920 of FIG. 9, the UE 1030 of FIGS. 10A and/or 10B, the apparatus 1602 of FIG. 16, the apparatus 1602' of FIG. 17, etc.).

At 1202, the UE may receive a user service description (USD) as part of a user service discovery procedure associated with a multimedia broadcast multicast service. For example, as described above in connection with FIG. 8, the UE 830 may receive the USD 850. In some aspects, the UE 830 may receive the USD 850 as part of a service discovery procedure associated with a multimedia broadcast multicast service, such as eMBMS.

At 1204, the UE may receive template information, based at least in part on the USD, that identifies a template for generating a plurality of uniform resource identifiers (URIs) for accessing media content. For example, as described above in connection with FIG. 11 (e.g., at 1102), the UE may receive template information. The template information may identify a template for generating a plurality of URIs for accessing media content, as described in more detail elsewhere herein. In some aspects, the UE may receive the template information based at least in part on the USD. For example, the template information may be included in the USD. Additionally, or alternatively, the template information may be received via a multimedia broadcast multicast service (e.g., eMBMS).

At 1206, the UE may generate, based on the template, one or more URIs of the plurality of URIs for accessing one or more portions of the media content. For example, as described above in connection with FIG. 11 (e.g., at 1104), the UE may generate one or more URIs for accessing one or more portions of the media content.

At 1208, the UE may store the one or more URIs in a playlist file. For example, as described above in connection with FIG. 11 (e.g., at 1106), the UE may store the one or more URIs in the playlist file.

At 1210, the UE may access the one or more portions of the media content using the one or more URIs of the plurality of URIs stored in the playlist file. For example, as described above in connection with FIG. 8, the UE 830 (e.g., an HLS client) may use the one or more generated URIs, stored in the playlist file 860, to access one or more portions of the media content. For example, the one or more portions of the media content may be stored by one or more servers (e.g., the video server 840, the video server 1040, the audio server 1050, etc.), and the UE 830 may use the one or more generated URIs to access the one or more portions of the media content stored by the one or more servers.

As an example, the one or more portions of the media content may include a first portion of the media content and a second portion of the media content, the plurality of URIs may include a first URI and a second URI, and the first and second URIs may be included in the playlist file. The UE may access the first portion of the media content based on the first URI included in the playlist file, and may access the second portion of the media content based on the second URI included in the playlist file.

In some aspects, the UE may access the one or more portions of the media content using a multimedia broadcast multicast service, such as eMBMS. In some aspects, the UE may access the one or more portions of the media content via a unicast service. In this way, the UE may access the one or more portions of the media content even if the UE fails to receive one or more URIs corresponding to the one or more portions of the media content (e.g., due to the UE being out of range of an eNB that provides the one or more URIs in a playlist file update, due to an error in the playlist file update, etc.). In this case, the UE may generate the one or more URIs rather than receiving the one or more URIs.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

FIG. 13 is a flow chart 1300 of a method of wireless communication. In some aspects, the method may be performed by a UE (e.g., one or more of the UE 102 of FIG. 1, the UE 206 of FIG. 2, the UE 650 of FIG. 6, the UEs 760, 770 of FIG. 7, the UE 830 of FIG. 8, the UE 920 of FIG. 9, the UE 1030 of FIGS. 10A and/or 10B, the apparatus 1602 of FIG. 16, the apparatus 1602' of FIG. 17, etc.).

At 1302, the UE may determine that a server-provided update to a playlist file is absent. For example, as described above in connection with FIG. 9, UE 920 may leave a cell 930, and may fail to receive an update to the playlist file 950 from the eNB 910. The eNB 910 may receive the update to the playlist file 950 from a server, such as a BM-SC, a video server, an audio server, or the like. The update to the playlist file 950 may include one or more URIs for accessing one or more portions of media content. The UE 920 may fail to receive these URIs.

In some aspects, the UE 920 may determine that a URI is absent from the playlist file 950 before playback of the media content or during playback of the media content. For example, the UE 920 may use a first URI to access a first portion of the media content, and may determine that a second URI, to be used to access a second portion of the media content, is absent from the playlist file 950.

At 1304, the UE may generate, based on determining that the server-provided update is absent, one or more URIs of a plurality of URIs for accessing one or more portions of the media content. For example, as described above in connection with FIG. 9, based on failing to receive the one or more URIs, the UE 920 may generate the one or more URIs. In some aspects, the UE 920 may determine that a URI is absent from the playlist file 950, and may generate the URI based on determining that the URI is absent from the playlist file 950. In some aspects, the UE 920 may generate the URI without determining that the URI is absent from the playlist file 950. For example, the USD may indicate a user service that provides HLS content, may provide the template information (and/or other information, such as a master playlist file, a media playlist file, or the like), and/or may indicate that the UE 920 is to generate media playlist files using the template information. In this case, the UE 920 may generate the playlist file 950 (e.g., based on receiving the template information). The UE 920 may generate the URI using a template, as described in more detail elsewhere herein.

In some aspects, the template may identify a schedule associated with the plurality of URIs, and the UE 920 may generate the one or more URIs based on the schedule. For example, the schedule may include a start time for the media content, a segment duration of a portion of the media content, or the like. As described above in connection with FIG. 9, the UE 920 may identify a current time, may determine a start time of the media content and a segment duration of portions of the media content, and may use the current time, the start time, and the segment durations to generate one or more URIs based on the template. In some aspects, the UE 920 may store the one or more URIs in a playlist file, as described in more detail elsewhere herein. In this way, the UE 920 may continue to play back the media content even when the UE 920 fails to receive URIs for accessing the media content.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

FIG. 14 is a flow chart 1400 of a method of wireless communication. In some aspects, the method may be performed by a UE (e.g., one or more of the UE 102 of FIG. 1, the UE 206 of FIG. 2, the UE 650 of FIG. 6, the UEs 760, 770 of FIG. 7, the UE 830 of FIG. 8, the UE 920 of FIG. 9, the UE 1030 of FIGS. 10A and/or 10B, the apparatus 1602 of FIG. 16, the apparatus 1602' of FIG. 17, etc.).

At 1402, the UE may receive a master playlist file associated with a hypertext transfer protocol (HTTP) live streaming (HLS) protocol. For example, as described above in connection with FIG. 10A, the UE 1030 may receive a master playlist file. In some aspects, the master playlist file may be included in the USD 1060. Additionally, or alternatively, the master playlist file may identify one or more media playlist files associated with the HLS protocol. A media playlist file may include one or more URIs for accessing media content. Different URIs included in different media playlist files may be associated with different parameters, such as different media types, different languages, different bitrates, or the like.

At 1404, the UE may generate a media playlist file associated with the HLS protocol. In some aspects, the UE 1030 may generate a media playlist file to be included in the master playlist file. Additionally, or alternatively, the UE 1030 may receive the media playlist file (e.g., from the eNB 1020).

At 1406, the UE may store a playlist URI, for accessing the media playlist file, in the master playlist file. For example, the UE 1030 may store a playlist URI in the master playlist file. The playlist URI may be used to access a media playlist (e.g., based on parameters associated with media content to be accessed).

At 1408, the UE may generate, based on a template, one or more URIs of a plurality of URIs for accessing one or more portions of media content. For example, as described above in connection with FIGS. 11, 12, and 13 (e.g., at 1104, 1206, and 1304), the UE 1030 may generate one or more URIs of a plurality of URIs for accessing one or more portions of media content.

At 1410, the UE may store the one or more URIs in the media playlist file. For example, as described above in connection with FIG. 10B, UE 1030 may store one or more generated URIs in a media playlist file. For example, UE 1030 may store one or more URIs associated with first parameters in the first media playlist file 1070, and may store one or more URIs associated with second parameters in the second media playlist file 1080.

In this way, the UE 1030 may generate URIs for one or more media playlist files, and may use the URIs to access one or more portions of media content even if the UE 1030 fails to receive the URIs from the eNB 1020. By generating URIs for multiple media playlist files, the UE 1030 may permit media content with different parameters (e.g., different media types, different languages, etc.) to be accessed for continuous playback even during a service interruption that prevents the UE 1030 from receiving the URIs. The UE 1030 may store playlist URIs for the media playlist files in a master playlist file, thereby permitting the media playlist files (and the associated URIs) to be accessed using the master playlist file.

Although FIG. 14 shows example blocks of a method of wireless communication, in some aspects, the method may include additional blocks, fewer blocks, different blocks, or differently arranged blocks than those shown in FIG. 14. Additionally, or alternatively, two or more blocks shown in FIG. 14 may be performed in parallel.

FIG. 15 is a flow chart 1500 of a method of wireless communication. In some aspects, the method may be performed by a UE (e.g., one or more of the UE 102 of FIG. 1, the UE 206 of FIG. 2, the UE 650 of FIG. 6, the UEs 760, 770 of FIG. 7, the UE 830 of FIG. 8, the UE 920 of FIG. 9, the UE 1030 of FIGS. 10A and/or 10B, the apparatus 1602 of FIG. 16, the apparatus 1602' of FIG. 17, etc.).

At 1502, the UE may receive media type information that describes a media type of media content and/or language information that identifies a language associated with the media content. For example, as described above in connection with FIG. 10A, the UE 1030 may receive media type information that describes a media type associated with media content (e.g., a video media type, an audio media type, etc.). Additionally, or alternatively, the UE 1030 may receive language information that identifies a language associated with the media content (e.g., English, Spanish, etc.). In some aspects, the UE 1030 may receive information that identifies other parameters associated with the media content (e.g., a bitrate, a format, etc.).

At 1504, the UE may generate, based on a template, one or more URIs of a plurality of URIs for accessing one or more portions of the media content. For example, as described above in connection with FIGS. 11, 12, 13, and 14 (e.g., at 1104, 1206, 1304, and 1408), the UE 1030 may generate one or more URIs of a plurality of URIs for accessing one or more portions of media content. In some aspects, the UE 1030 may use a template to generate the one or more URIs. Additionally, or alternatively, the template may be different for URIs associated with different parameters (e.g., different media types, different languages, etc.). For example, the template may identify different static portions for URIs associated with different parameters, may identify different dynamic portions for URIs associated with different parameters, or the like.

At 1506, the UE may identify a playlist file based on the media type information and/or the language information. For example, as described above in connection with FIG. 10B, the UE 1030 may identify a playlist file (e.g., a media playlist file), for storing one or more generated URIs, based on the media type information, the language information, or the like. As an example, the UE 1030 may identify the first media playlist file 1070, for storing one or more generated URIs for accessing video media content, based on a video media type. As another example, the UE 1030 may identify the second media playlist file 1080, for storing one or more generated URIs for accessing English audio media content, based on an audio media type and a language of English.

At 1508, the UE may store the one or more URIs in the playlist file. For example, as described above in connection with FIGS. 11, 12, and 14 (e.g., at 1106, 1208, and 1410), the UE 1030 may store the one or more URIs in the playlist file. As an example, and as described above in connection with FIG. 10B, the UE 1030 may store one or more generated URIs, associated with a video media type, in the first media playlist file 1070. As another example, the UE 1030 may store one or more generated URIs, associated with an audio media type and a language of English, in the second media playlist file 1080.

In this way, the UE 1030 may permit media content with different parameters to be accessed even when the UE 1030 fails to receive URIs for accessing the media content with the different parameters.

Although FIG. 15 shows example blocks of a method of wireless communication, in some aspects, the method may include additional blocks, fewer blocks, different blocks, or differently arranged blocks than those shown in FIG. 15. Additionally, or alternatively, two or more blocks shown in FIG. 15 may be performed in parallel.

FIG. 16 is a conceptual data flow diagram 1600 illustrating the data flow between different modules/means/components in an exemplary apparatus 1602. The apparatus 1602 may be a UE. As shown, the apparatus 1602 may include a reception module 1604, a generating module 1606, a storing module 1608, an accessing module 1610, a transmission module 1612, a determining module 1614, and an identifying module 1616.

The reception module 1604 may receive data 1618, which may include template information, a user service description (USD), a master playlist file, media type information, language information, or the like, as described in more detail elsewhere herein. In some aspects, the apparatus 1602 may receive the data 1618 as input from an eNB 1650 (e.g., which may include one or more of the eNBs 106, 108 of FIG. 1, the eNBs 204, 208 of FIG. 2, the eNB 610 of FIG. 6, the eNBs 752, 754 of FIG. 7, the eNB 820 of FIG. 8, the eNB 910 of FIG. 9, the eNB 1020 of FIGS. 10A and 10B, etc.). As shown, the reception module 1604 may provide the data 1618 (e.g., which may be processed by reception module 1604) as output to generating module 1606 (e.g., as data 1620), determining module 1614 (e.g., as data 1628), identifying module 1616 (e.g., as data 1634), and/or transmission module 1612 (e.g., as data 1638).

The generating module 1606 may receive data 1620 from reception module 1604. Based on data 1620, the generating module 1606 may generate one or more URIs of a plurality of URIs for accessing one or more portions of media content, may generate a playlist file (e.g., a master playlist file, a media playlist file, etc.), or the like. As shown, the generating module 1606 may provide output to storing module 1608 (e.g., as data 1622).

The storing module 1608 may receive data 1622 from generating module 1606 and/or may receive data 1640 from identifying module 1616. Based on data 1622 and/or data 1640, the storing module 1608 may store one or more URIs (e.g., one or more received URIs, one or more generated URIs, etc.) in a playlist file, may store a playlist URI (e.g., that identifies a media playlist file) in a master playlist file, or the like. As shown, the storing module 1608 may provide output to accessing module 1610 (e.g., as data 1624).

The accessing module 1610 may receive data 1624 from storing module 1608 and/or may receive data 1630 from the determining module 1614. Based on data 1624 and/or data 1630, the accessing module 1610 may access one or more portions of media content using one or more URIs of a plurality of URIs stored in the playlist file, may access a first portion of the media content based on a first URI included in the playlist file, may access a second portion of the media content based on a second URI included in the playlist file, may access the one or more portions of the media content via a multimedia broadcast multicast service, may access the one or more portions of the media content via a unicast service, or the like. As shown, the accessing module 1610 may provide data 1626 to the transmission module 1612. In some aspects, the accessing module 1610 may be included in an HLS client.

The transmission module 1612 may assist the accessing module 1610 in accessing media content and/or portions of media content. The transmission module 1612 may receive data 1626 from the accessing module 1610, data 1632 from the determining module 1614, data 1636 from the identifying module 1616, and/or data 1638 from the reception module 1604. Based on one or more of data 1626, data 1632, data 1636, and/or data 1638, the transmission module 1612 may transmit data 1642 to the eNB 1650 to assist the accessing module 1610 in accessing the media content and/or the portions of media content (e.g., may transmit data 1642 toward a device that provides the media content and/or a portion of the media content, such as a video server, an audio server, or the like). In some aspects, transmission module 1612 may not transmit data 1642 to the eNB 1650. For example, data 1642 may terminate at the apparatus 1602 (e.g., at middleware of the apparatus 1602) if data 1642 includes a request for media content already obtained by apparatus 1602 (e.g., because apparatus 1602 successfully received the media content from the eNB 1650).

The determining module 1614 may receive data 1628 from the reception module 1604. Based on data 1628, the determining module 1614 may determine that a server-provided update to the playlist file is absent (e.g., before playback of the media content, during playback of the media content, or the like). As shown, the determining module 1614 may provide data 1630 to the accessing module 1610, and/or may provide data 1632 to the transmission module 1612.

The identifying module 1616 may receive data 1634 from the reception module 1604. Based on data 1634, the identifying module 1616 may identify a playlist file, from a plurality of playlist files, based on media type information and/or language information. As shown, the identifying module 1616 may provide data 1636 to the transmission module 1612.

The apparatus may include additional modules that perform each of the blocks of the algorithm in the aforementioned flow charts of FIGS. 11, 12, 13, 14, and/or 15. As such, each block in the aforementioned flow charts of FIGS. 11, 12, 13, 14, and/or 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof The number and arrangement of modules shown in FIG. 16 are provided as an example. In practice, there may be additional modules, fewer modules, different modules, or differently arranged modules than those shown in FIG. 16. Furthermore, two or more modules shown in FIG. 16 may be implemented within a single module, or a single module shown in FIG. 16 may be implemented as multiple, distributed modules. Additionally, or alternatively, a set of modules (e.g., one or more modules) shown in FIG. 16 may perform one or more functions described as being performed by another set of modules shown in FIG. 16.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, 1610, 1612, 1614, and 1616, and the computer-readable medium/memory 1706. The bus 1724 may also link various other circuits, such as timing sources, peripherals, voltage regulators, and/or power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception module 1604. In addition, the transceiver 1710 receives information from the processing system 1714, specifically the transmission module 1612, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the modules 1604, 1606, 1608, 1610, 1612, 1614, and/or 1616. The modules may be software modules running in the processor 1704, resident/stored in the computer readable medium/memory 1706, one or more hardware modules coupled to the processor 1704, or some combination thereof The processing system 1714 may be a component of the UE 650 (e.g., which may include one or more other UEs described herein) and may include the memory 660 and/or at least one of the TX processor 668, the RX processor 656, and the controller/processor 659.

In one configuration, the apparatus 1602/1602' for wireless communication includes means for receiving template information that identifies a template for generating a plurality of uniform resource identifiers (URIs) for accessing media content, means for generating one or more URIs of the plurality of URIs for accessing one or more portions of the media content, means for storing the one or more URIs in a playlist file, means for providing the playlist file to an HLS client, means for receiving a user service description (USD) as part of a user service discovery procedure associated with a multimedia broadcast multicast service, means for accessing a first portion of the media content based on a first URI included in the playlist file, means for accessing a second portion of the media content based on a second URI included in the playlist file, means for accessing the one or more portions of the media content using the one or more URIs of the plurality of URIs stored in the playlist file, means for determining that a server-provided update to the playlist file is absent, means for receiving a master playlist file associated with a hypertext transfer protocol (HTTP) live streaming (HLS) protocol, means for generating the playlist file, means for storing a playlist URI in the master playlist file, means for receiving media type information that describes a media type of the media content, means for identifying the playlist file based on the media type information, means for receiving language information that identifies a language associated with the media content, and/or means for identifying the playlist file based on the language information. The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for".

What is claimed is:

1. A method for wireless communication, comprising:
   receiving, by a user equipment (UE), a user service description (USD) as part of a user service discovery procedure associated with a multimedia broadcast multicast service, the USD comprising template information that identifies a template for generating a plurality of uniform resource identifiers (URIs) for accessing media content and the USD indicating a length of the media content;
   determining, by the UE, that a server-provided update to a playlist file is absent based at least in part on the length of the media content, the playlist file comprising at least a first URI of the plurality of URIs for accessing a first portion of the media content;
   generating, by the UE and based on the template, one or more subsequent URIs of the plurality of URIs for accessing one or more subsequent portions of the media content in response to determining that the server-provided update to the playlist file is absent; and
   storing, by the UE, the one or more subsequent URIs in the playlist file.

2. The method of claim 1, further comprising:
   providing the playlist file to a hypertext transfer protocol (HTTP) live streaming (HLS) client of the UE,
   wherein the HLS client uses the playlist file to access the one or more subsequent portions of the media content without altering the one or more subsequent URIs.

3. The method of claim 2, wherein the HLS client includes an accessing module that accesses the one or more subsequent portions of the media content using the playlist file.

4. The method of claim 2, wherein the generating and the storing are performed by middleware of the UE, and
   wherein the middleware provides the playlist file to the HLS client.

5. The method of claim 1, further comprising:
   accessing the one or more subsequent portions of the media content using the one or more subsequent URIs of the plurality of URIs stored in the playlist file.

6. The method of claim 1, comprising:
   accessing the one or more subsequent portions of the media content via a unicast service.

7. The method of claim 1, wherein the template identifies a schedule associated with the plurality of URIs, and
wherein the one or more subsequent URIs are generated based on the schedule.

8. The method of claim 1, wherein the template identifies a static portion of each URI of the plurality of URIs and a dynamic portion of each URI of the plurality of URIs, the dynamic portion being different for each URI of the plurality of URIs, and
wherein the one or more subsequent URIs each include the static portion and the dynamic portion.

9. The method of claim 1, further comprising:
receiving a master playlist file associated with a hypertext transfer protocol (HTTP) live streaming (HLS) protocol;
generating the playlist file, wherein the playlist file is a media playlist file associated with the HLS protocol; and
storing a playlist URI, for accessing the media playlist file, in the master playlist file.

10. The method of claim 1, wherein the playlist file includes playlist information that identifies:
a duration of the one or more portions of the media content;
a version of a protocol associated with the playlist file;
a starting media sequence identifier associated with the playlist file; or
any combination thereof.

11. The method of claim 1, further comprising:
receiving media type information that describes a media type of the media content; and
identifying the playlist file, from a plurality of playlist files, based on the media type information,
wherein the one or more subsequent URIs are stored in the playlist file based on the media type of the media content.

12. The method of claim 1, further comprising:
receiving language information that identifies a language associated with the media content; and
identifying the playlist file, from a plurality of playlist files, based on the language information,
wherein the one or more subsequent URIs are stored in the playlist file based on the language associated with the media content.

13. A user equipment for wireless communication, comprising:
means for receiving a user service description (USD) as part of a user service discovery procedure associated with a multimedia broadcast multicast service, the USD comprising template information that identifies a template for generating a plurality of uniform resource identifiers (URIs) for accessing media content and the USD indicating a length of the media content;
means for determining that a server-provided update to a playlist file is absent based at least in part on the length of the media content, the playlist file comprising at least a first URI of the plurality of URIs for accessing a first portion of the media content;
means for generating, based on the template, one or more subsequent URIs of the plurality of URIs for accessing one or more subsequent portions of the media content in response to determining that the server-provided update to the playlist file is absent;
means for storing the one or more subsequent URIs in the playlist file; and
means for providing the playlist file to a hypertext transfer protocol (HTTP) live streaming (HLS) client of the user equipment, wherein the HLS client is configured to use the playlist file to access the one or more subsequent portions of the media content without altering the one or more subsequent URIs.

14. The user equipment of claim 13, wherein the HLS client includes a module that is configured to access the one or more subsequent portions of the media content using the one or more subsequent URIs stored in the playlist file.

15. The user equipment of claim 13, wherein the means for providing the playlist file to the HLS client comprises middleware that is configured to provide the playlist file to the HLS client.

16. A user equipment for wireless communication, comprising:
a memory; and
at least one processor coupled to the memory and configured to:
receive a user service description (USD) as part of a user service discovery procedure associated with a multimedia broadcast multicast service, the USD comprising template information that identifies a template for generating a plurality of uniform resource identifiers (URIs) for accessing media content and the USD indicating a length of the media content;
determine that a server-provided update to a playlist file is absent based at least in part on the length of the media content, the playlist file comprising at least a first URI of the plurality of URIs for accessing a first portion of the media content;
generate, based on the template, one or more subsequent URIs of the plurality of URIs for accessing one or more subsequent portions of the media content; and
store the one or more subsequent URIs in the playlist file.

17. The user equipment of claim 16, wherein the at least one processor is further configured to:
provide the playlist file to a hypertext transfer protocol (HTTP) live streaming (HLS) client of the user equipment,
wherein the HLS client is configured to use the one or more subsequent URIs stored in the playlist file to access the one or more subsequent portions of the media content.

18. The user equipment of claim 17, wherein the HLS client includes an accessing module that is configured to access the one or more subsequent portions of the media content using the one or more subsequent URIs stored in the playlist file.

19. The user equipment of claim 17, wherein the generating and the storing are performed by middleware of the user equipment, and
wherein the middleware is configured to provide the playlist file to the HLS client.

20. A non-transitory computer-readable medium storing computer executable code for wireless communication, comprising code for:
receiving, by a user equipment, a user service description (USD) as part of a user service discovery procedure associated with a multimedia broadcast multicast service, the USD comprising template information that identifies a template for generating a plurality of uniform resource identifiers (URIs) for accessing media content and the USD indicating a length of the media content;

determining, by the user equipment, that a server-provided update to a playlist file is absent based at least in part on the length of the media content, the playlist file comprising at least a first URI of the plurality of URIs for accessing a first portion of the media content generating, by the user equipment and based on the template, one or more subsequent URIs of the plurality of URIs for accessing one or more subsequent portions of the media content in response to determining that the server-provided update to the playlist file is absent; and storing, by the user equipment, the one or more subsequent URIs in the playlist file.

21. The non-transitory computer-readable medium of claim 20, further comprising code for:

providing the playlist file to a hypertext transfer protocol (HTTP) live streaming (HLS) client of the user equipment; and accessing, by the HLS client, the one or more subsequent portions of the media content without altering the one or more subsequent URIs stored in the playlist file.

22. The non-transitory computer-readable medium of claim 21, wherein the HLS client includes an accessing module that accesses the one or more subsequent portions of the media content using the playlist file.

23. The non-transitory computer-readable medium of claim 21, wherein generating and storing are performed by middleware of the user equipment, and wherein the middleware provides the playlist file to the HLS client.

* * * * *